US012459000B2

(12) United States Patent
Wang et al.

(10) Patent No.: US 12,459,000 B2
(45) Date of Patent: Nov. 4, 2025

(54) METHODS OF COATING A SUBSTRATE

(71) Applicant: AXALTA COATING SYSTEMS IP CO., LLC, Wilmington, DE (US)

(72) Inventors: Shih-Wa Wang, Philadelphia, PA (US); Cameron Stevens, Philadelphia, PA (US); James Neal, Corvallis, OR (US); Carmen Flosbach, Wuppertal (DE); Michael S. Wolfe, Wilmington, DE (US); John R. Moore, Lansdale, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 95 days.

(21) Appl. No.: 18/068,587

(22) Filed: Dec. 20, 2022

(65) Prior Publication Data

US 2023/0191450 A1 Jun. 22, 2023

Related U.S. Application Data

(63) Continuation-in-part of application No. 17/645,320, filed on Dec. 21, 2021, now abandoned.

(51) Int. Cl.
*B05D 5/02* (2006.01)
*B05D 3/04* (2006.01)
*C09D 167/02* (2006.01)

(52) U.S. Cl.
CPC ............ *B05D 5/02* (2013.01); *B05D 3/0406* (2013.01); *C09D 167/02* (2013.01)

(58) Field of Classification Search
None
See application file for complete search history.

(56) References Cited

U.S. PATENT DOCUMENTS

| 4,403,003 | A  | 9/1983 | Backhouse |
| 8,499,713 | B2 | 8/2013 | Nakazawa et al. |

(Continued)

FOREIGN PATENT DOCUMENTS

| CN | 103681983 A | 3/2014 |
| EP | 996033 A1   | 4/2000 |
| JP | S5091640 A  | 7/1975 |

OTHER PUBLICATIONS

Sarah Krainer, et al., "The Effect of Viscosity And Surface Tension On Inkjet Printed Picoliter Dots", Royal Society Of Chemistry, RSC Advances, 2019, pp. 31708-31719, No. 9.

(Continued)

*Primary Examiner* — Joshua L Allen
*Assistant Examiner* — Bradford M Gates
(74) *Attorney, Agent, or Firm* — Ingrassia Fisher & Lorenz, LLP

(57) ABSTRACT

Methods of coating a substrate are provided. In an exemplary embodiment, a coating composition is applied to the substrate with a high transfer efficiency applicator to produce a coating layer, where the high transfer efficiency applicator and the substrate remain spatially separate while the coating composition is applied. A droplet of the coating composition expelled from the high transfer efficiency applicator has a particle size of about 10 microns or greater. The coating composition has a viscosity of from about 1,000 to about 1,000,000 centipoise when the coating composition is subject to a shear rate of about 0.1 reciprocal seconds ($s^{-1}$). However, the coating composition is non-Newtonian such that a coating composition viscosity decreases when the shear rate is increased to the coating composition. The coating layer is impinged with a gas such that a coating layer surface moves upon impingement with the gas.

20 Claims, 18 Drawing Sheets

(56) References Cited

U.S. PATENT DOCUMENTS

| | | | |
|---|---|---|---|
| 9,343,339 B2 | 5/2016 | Inagaki et al. | |
| 9,527,275 B1* | 12/2016 | Flannigan | B41J 25/308 |
| 2006/0068122 A1* | 3/2006 | Kanouni | C08J 7/065 |
| | | | 427/532 |
| 2009/0304936 A1 | 12/2009 | Nakazawa | |
| 2010/0221449 A1 | 9/2010 | Schlatterbeck et al. | |
| 2012/0021192 A1* | 1/2012 | Mheidle | C09D 11/40 |
| | | | 427/256 |
| 2013/0089668 A1* | 4/2013 | Inagaki | B05D 3/04 |
| | | | 427/256 |
| 2016/0250877 A1* | 9/2016 | Schlatterbeck | B41J 11/00214 |
| | | | 428/144 |
| 2019/0030886 A1* | 1/2019 | Ingram | B41M 5/0088 |

OTHER PUBLICATIONS

Thomas Heusser, "Audi Adopts Overspray-Free Printing in Series Production", PCI Magazine, May 8, 2020, p. 33 in print edition.

Frank Herre, "Overspray-Free Painting", PCI Magazine, Nov. 5, 2019.

Yong-Hun Kweon, et al., "Study On The Wiping Gas Jet In Continuous Galvanizing Line", Journal Of Thermal Science, May 21, 2011, pp. 242-247.

Anne Gosset, et al. "Jet Wiping In Hot-Dip Galvanization", Journal Of Fluids Engineering, Apr. 2007, pp. 466-475, vol. 29, No. 4.

Eddy Hagen, "Inkjet Isn't About Jetting Small Drops Of Ink Anymore", Strategic Insights, Nov. 1, 2017.

DÜRR, "DÜRR Enables Fully Automated Painting Of Cars In Two Colors", Green Car Congress, Jul. 31, 2019. Retrieved from Internet URL :<https://www.greencarcongress.com/2019/07/20190731-dürr.html>.

DÜRR, "Eco Paint Jet—Overspray-Free Paint Application", DÜRR website, accessed on May 23, 2020. Retrieved from Internet URL:<https://www.durr.com/en/products/paint-shop-application-technology/paint-application/overspray-free-paint-application/>.

DÜRR, EcoPaint Jet, Youtube Video available at https://www.youtube.com/watch?app=desktop&v=bT8LzxOhNew, May 15, 2019.

DÜRR, Dosing System EcoShot Meter, Youtube Video available at https://www.youtube.com/watch?app=desktop&v=eHQ2IwDACBk, Feb. 11, 2020.

* cited by examiner

METHODS OF COATING A SUBSTRATE

CROSS-REFERENCE TO RELATED APPLICATIONS

This is a continuation-in-part of, and claims priority to, U.S. patent application Ser. No. 17/645,320, filed Dec. 21, 2021, the contents of which are incorporated herein in its entirety.

TECHNICAL FIELD

The technical field generally relates to methods of coating a substrate, and more particularly relates to methods of coating a substrate with a high transfer efficiency applicator.

BACKGROUND

Ink jet printing is a non-impact printing process in which a liquid stream of ink (or other liquid coating) is deposited on a substrate. These processes have the advantage of allowing digital printing of the substrate, which can be easily tailored to different individual requirements. The stream of ink can be jetted onto the substrate by a variety of jet application methods, including a continuous liquid stream, drop-on-demand printing, and other techniques. The liquid coating is typically jetted from a high transfer efficiency applicator that is positioned in a printer head.

Conventional inkjet coatings typically have been formulated to print on porous substrates such as paper and textiles, where the ink is rapidly absorbed into the substrate to facilitating drying and handling shortly after printing. However, other applications are developing, such as jet printing of coatings for automobiles or other vehicles, as well as a wide variety of other substrates. Automotive coatings have durability requirements that are far greater in terms of physical durability, corrosion protection, longevity, etc. than that of papers or fabrics, as well as appearance requirements. Therefore, jet printing of automobiles typically utilizes different types of jet coatings than for papers, fabrics, and other substrates. Other specialized coatings may be utilized for other applications, such as wood substrates, plastic substrates, etc.

In the automotive industry, a vehicle body is typically covered with a series of finishes including, for example, an electrocoat, a primer, a colored basecoat providing the color, and a clear topcoat to provide addition protection and an attractive finish. Currently, most automobile bodies are painted with the basecoat being applied in a spray operation where the paint droplets contact the substrate as an aerosol. The coating is applied with pneumatic spray or rotary equipment producing a broad jet of paint droplets with a wide droplet size distribution. This has the advantage of producing a uniform high-quality coating in a relatively short time by an automated process. However, if a vehicle is to be coated with multiple colors, masking and multiple paint application processes are required. Furthermore, aerosol coating application usually results in some loss of the coating product from overspray and other factors.

For use with ink jet printing applicators, many automotive coatings are formulated such that, after being sprayed, they relax and increase in viscosity so as to resist sagging and slumping. For this reason, many are considered to have non-Newtonian characteristics, more specifically, the viscosity of the liquid coating decreases with increasing shear rate. This non-Newtonian property is especially desirable when the automotive coatings are applied to vertical surfaces. The coating is exposed to a high shear rate in the application process, so the viscosity is reduced such that the liquid coating readily flows through the high transfer efficiency applicator and the printer head, and to evenly coat the substrate. However, after coating the substrate, the viscosity rapidly increases and the coating stays in place without sagging or flowing.

Jet printing often involves applying coatings from a plurality of high transfer efficiency applicators within a printing head, and the printing head is sequentially passed over adjacent sections of the substrate for coating. Conventional ink jet printing ink does not produce visible variations in the coating layer thickness of sequential printing passes because the coating has a low viscosity and flows sufficiently to produce an even appearance. In contrast, after automotive paint is applied, since the shear stress is removed the shear rate decreases and the viscosity increases. The slight overlap or valley between high transfer efficiency applicators in the printer head, or between the edges of sequential passes of the printer head over a substrate, produces a varying coating layer thickness that is visible to the human eye.

In order to develop a liquid coating for overspray-free application to vehicles with a high transfer efficiency applicator, extra solvent and/or a low-viscosity coating composition are typically required for reliable jetting compared to that of conventional spray process. These requirements make sag control more difficult for two reasons. (1) For conventional spray applications, significant volatile loss occurs due to a broad distribution of droplet sizes, including a substantial fraction less than 20 microns, and the large throw distance between spray head and substrate (such as about 10 to about 30 centimeters (cm)). In contrast, for the high transfer efficiency applicators of interest, the drop or stream diameter is very uniform in size (about 20 to about 300 microns), does not contain fine droplets less than about 20 microns, and is applied with a very short throw distance of only about 0.1 to about 3 cm. Because of these differences, the solvent evaporation that typically occurs with spray applications, and which results in viscosity increases and consequently increased sag resistance, is not present for overspray free high transfer efficiency applicators. High transfer efficiency applicators have volatile losses that are minimal, and so viscosity increases due to solvent losses do not occur. (2) For conventionally spray applied coatings, incorporation of rheology control agents can be incorporated into the bulk coating composition, where the rheology control agents impart pseudoplastic behavior which will resist sag after the coating composition is applied to the substrate. However, while many of these rheology control agents are effective at preventing sag, they impede the desired flow through a high transfer efficiency applicator, and they impede the leveling desired after the coating is applied to the substrate to improve appearance. Consequently, incomplete flow and leveling of individual nozzle lines of the high transfer efficiency applicator results, and incomplete coalescence of adjacent printed overlapping stripes can produce visible defects.

Both of these considerations make sag control of the applied coating more difficult when using a high transfer efficiency applicator. The sag control agents traditionally used for spray application techniques can produce jettability issues, so new solutions are desirable.

Accordingly, methods suitable for overspray free application to a substrate by utilizing a high transfer efficiency applicator that permits coating flow and leveling after application for good appearance are desired. Furthermore, methods for the uniform painting of an automobile using a high transfer efficiency applicator are desirable. Furthermore, other desirable features and characteristics will become apparent from the subsequent detailed description and the appended claims, taken in conjunction with this background.

BRIEF SUMMARY

Methods of coating a substrate are provided. In an exemplary embodiment, a coating composition is applied to the substrate with a high transfer efficiency applicator to produce a coating layer, where the high transfer efficiency applicator and the substrate remain spatially separate while the coating composition is applied. The coating composition has a viscosity of from about 1,000 to about 1,000,000 centipoise when the coating composition is at a shear rate of about 0.1 seconds$^{-1}$ (s$^{-1}$). However, the coating composition is non-Newtonian such that a coating composition viscosity decreases when the shear rate is increased. The coating layer is impinged with a gas such that a coating layer surface moves upon impingement with the gas.

Another method of coating a substrate is provided in another embodiment. A coating composition is applied to the substrate with a high transfer efficiency applicator to produce a coating layer, where the high transfer efficiency applicator and the substrate remain spatially separate while the coating composition is applied. The coating composition has a viscosity of from about 5,000 to about 500,000 centipoise when the coating composition is subject to a shear rate of about 0.1 reciprocal seconds (s"), but the coating composition is non-Newtonian such that a coating composition viscosity decreases when the shear rate is increased. The substrate is in a position other than horizontal during application of the coating composition. The coating layer is impinged with a gas such that a coating layer surface moves.

Yet another method is provided in yet another embodiment. A coating composition is applied to the substrate with a high transfer efficiency applicator to produce a coating layer, where the high transfer efficiency applicator and the substrate remain spatially separate while the coating composition is applied. The coating layer is impinged with a gas such that a textured surface is formed on the coating layer, where a coating layer thickness of the textured surface varies.

BRIEF DESCRIPTION OF THE DRAWINGS

The present disclosure will hereinafter be described in conjunction with the following drawing figures, wherein like numerals denote like elements, and wherein:

FIGS. 8A-13A are three dimensional plots of a coating layer thickness over an area where varying gas jet pressures where applied; and FIGS. 8B-13B are side sectional views of the plots in the corresponding FIGS. 5A-10A.

DETAILED DESCRIPTION

The following detailed description is merely exemplary in nature and is not intended to limit the application or uses of the embodiment described. Furthermore, there is no intention to be bound by any theory presented in the preceding technical field, background, brief summary, or the following detailed description.

Coatings that incorporate rheology control agents are desired to control sag when using a high transfer efficiency applicator. After application of a coating layer over a substrate, air or other gases are impinged on the surface of the coating layer. The force distribution of the applied air results in a sufficiently high force to the coating layer to cause flow and leveling that produces a smoother, more uniform surface. Alternatively, the force distribution of the applied air could be time and/or positional dependent to create a desired surface texture. In either case, after air impingement, the surface of the coating layer holds its shape due to the high viscosity resulting from a low shear rate of the coating layer.

Coating compositions for use with high transfer efficiency applicators have low viscosity when exposed to high shear rates, such as when being applied, but the viscosity increases when an applied coating layer sits on a substrate. After application of the coating layer with the high transfer efficiency applicator, gas is impinged on a coating layer surface. The force of the applied gas results in a sufficient force to the applied coating layer to cause the coating layer to flow and level. This creates a smooth surface with a more uniform appearance. Alternatively, the force distribution of the applied gas could be time and positionally dependent to create a desired surface texture. In either case, after gas impingement, the either uniform or textured surface appearance will remain due to the high viscosity resulting from the low shear rate of the applied coating layer.

Figure 1:
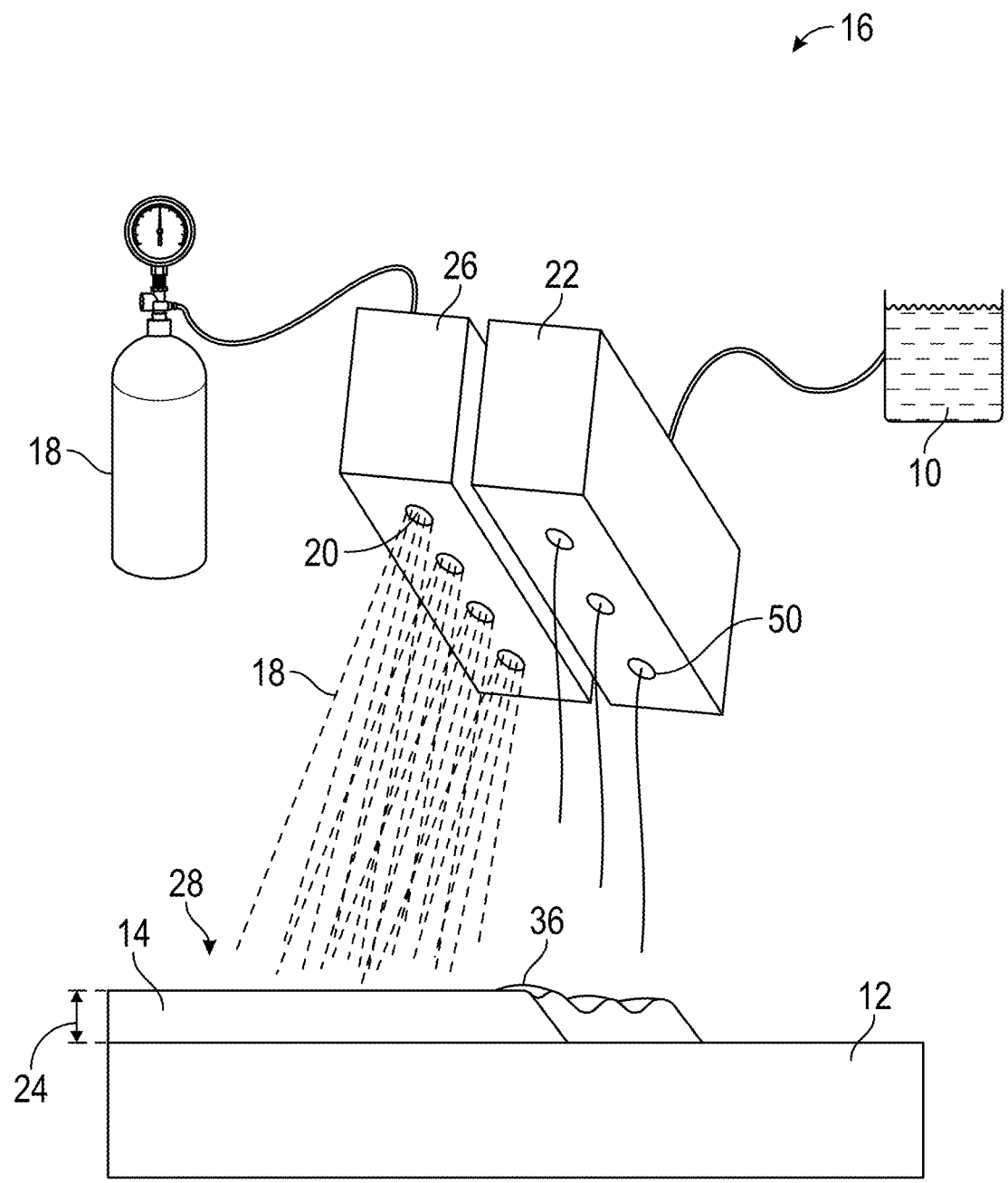
FIGS. 1, 5, and 7 are perspective views of steps of a method for coating a substrate, according to exemplary embodiments.

With reference to FIG. 1, a method of coating a substrate in accordance with an exemplary embodiment includes applying a coating composition 10 to a substrate 12 using a high transfer efficiency applicator 16 to form a coating layer 14. The coating composition 10 is jetted, ejected, or otherwise propelled out of the high transfer efficiency applicator 16. The high transfer efficiency applicator 16, which may be in a print head assembly 22, is used to apply the coating composition 10 to the substrate 12 to form the coating layer 14, where the coating composition 10 and coating layer 14 are non-Newtonian. The coating layer 14 may have ridges or valleys, where a coating layer thickness 24 varies over a short distance, so these ridges and/or valleys may be visible. Because the coating composition 10 is non-Newtonian, the coating composition 10 has a lower viscosity and becomes thinner when exposed to a shear rate. After application to the substrate 12, the coating layer 14 is no longer exposed to a shear rate, its viscosity increases, and it becomes thicker such that the coating layer 14 does not sag or run, even when on vertical or other non-horizontal substrates. As discussed in more detail below, the coating layer 14 may be smoothed after application with gas impingement, such as with an air knife. The gas impingement may smooth the coating layer 14 before the viscosity increases, where the viscosity increases as a result of the removed shear rate. In another embodiment, the coating layer 14 may have a desired texture defined into a coating layer surface 28. The desired texture may be introduced with a pulsating gas impingement, or other types of variation in the gas impingement, as explained in greater detail below.

As mentioned above, the coating composition 10 is non-Newtonian, and may have a sufficiently high viscosity at a low shear rate to prevent sag on a non-horizontal substrate 12. In an exemplary embodiment, the coating composition 10 has a viscosity of about 1,000 centipoise or greater at a shear rate of about 0.1 s$^{-1}$, as measured by the American Society for Testing Materials (ASTM) D2196. In alternate embodiments, the viscosity is from about 1,000 to about 1,000,000 centipoise, for example, from about 5,000 to about 500,000 centipoise, such as from about 7,500 to about 200,000 centipoise, all at a shear rate of about 0.1 s$^{-1}$. The coating composition 10 includes a solvent and a resin, and all reference to the viscosity at a shear rate of 0.1 s$^{-1}$ herein means the viscosity when all the initial solvent of the coating composition 10 is present, and the resin has not "set," "cured," or crosslinked.

The viscosity of the non-Newtonian coating composition 10 reduces when the coating composition 10 is exposed to an increased shear rate. The amount of reduction of the viscosity depends on the amount of shear rate that is applied. In an exemplary embodiment, the coating composition 10 may have a viscosity of about 100 centipoise or less when exposed to a shear rate of about 1,000 reciprocal seconds (s$^{-1}$). For example, the viscosity may be from about 1 to about 100 centipoise when exposed to a shear rate of about 1,000 s$^{-1}$. In alternate embodiments, the coating composition 10 may have a viscosity of from about 5 to about 100 centipoise, for example, from about 10 to about 60 centipoise, when exposed to a shear rate of about 1,000 s$^{-1}$. The viscosity may be determined in accordance with ASTM D2196.

In an exemplary embodiment, the coating composition 10 has a solids content of from about 5 to about 90 weight percent (wt. %,) based on a total weight of the coating composition 10, as determined using ASTM D2369-10. In other embodiments, the solids content of the coating composition 10 is from about 5 to about 80, for example, from about 20 to about 65, such as from about 30 to about 55 wt. %, based on the total weight of the coating composition 10, as determined using ASTM D2369-10. In various embodiments, a higher solids content may be possible due to the coating composition 10 not undergoing atomization which occurs with conventional spray equipment.

In an exemplary embodiment, the coating composition 10 includes a carrier chosen from water, a non-aqueous solvent, and combinations thereof. The coating composition 10 may be an aqueous (water borne) composition or a non-aqueous (solvent borne) composition. The carrier may be present in any suitable amount as is desirable by one of skill in the art. In an exemplary embodiment, the coating composition 10 includes the solvent, either aqueous or non-aqueous, in an amount of from about 15 to about 85 weight percent, based on the total weight of the coating composition 10.

In various embodiments, the carrier is a non-aqueous solvent and the coating composition 10 is a solvent borne composition. In such embodiments, an organic solvent content is greater than about 50 wt. %, based on a total weight of liquid carrier in the coating composition 10. Non-limiting examples of suitable organic solvents may include, but are not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate; alcohols; other organic compounds; and a combination thereof. The evaporation rate of the solvent may have an impact on the suitability of the coating composition 10 for jetting. Certain co-solvents may be incorporated into the coating composition 10 having increased or decreased evaporation rates thereby increasing or decreasing the evaporation rate of the coating composition 10. In other embodiments, the carrier includes water and the coating composition 10 is a waterborne composition. In such embodiments, the water content is greater than about 50 wt. %, based on a total weight of liquid carrier in the coating composition 10.

The coating composition 10 may have a pH of from about 1 to about 14, for example, from about 5 to about 12, such as from about 8 to about 10.

The coating composition 10 also includes a binder present in an amount of from about 15 to about 70 wt. %, based on the total weight of the coating composition 10. In various embodiments, the binder is present in an amount of from about 20 to about 65 wt. %, for example, from about 25 to about 60 wt. %, such as from about 30 to about 55 wt. %. In other embodiment, the binder is present in an amount of from about 40 to about 50 wt. %, for example, from about 45 to about 50 wt. %, where the wt. % mentioned above is based on the total weight of the coating composition 10. The term "binder" refers to film forming constituents of the coating composition 10. The binder can include polymers, oligomers, or a combination thereof that are used for forming a coating composition 10 having desired properties, such as hardness, protection, adhesion, and others. In various embodiments, the binder includes polymers that may crosslink during the cure. Exemplary binders suitable for use in the coating composition 10 include, but are not limited to, polyurethane polymers; polyester polymers; latex polymers; acrylic and/or methacrylic polymers; melamine polymers; a polymer that has a crosslinkable-functional group, such as an isocyanate-reactive group, where the polymers may be homopolymers or copolymers. Binders that crosslink on curing typically include a crosslinkable component and a crosslinking component, but binders may crosslink functional groups on a single type of polymer. The binder may also cure upon exposure to ultraviolet light, electron beams, or other sources of energy.

The coating composition 10 may optionally include a pigment, where the pigment is present in an amount of from about 0.1 to about 20 wt. % based on the total weight of the coating composition 10. In alternate embodiments, the pigment is present in an amount of from about 0.1 to about 15, for example, from about 0.5 to about 12 wt. %, where the wt. % is based on the total weight of the coating composition 10. The pigment may include one or more of a wide variety of pigments, such as, for example, effect pigments, functional pigments, extender pigments, and standard color pigments.

The coating composition 10 may optionally include various additional components, including but not limited to dyes, rheology modifiers, catalysts, antioxidants, ultraviolet light stabilizers, antifoaming agents, leveling agents, catalysts to speed curing, other conventional additives, or combinations thereof. Conventional additives may include, but are not limited to, dispersants, surfactants, wetting agents, anti-cratering agents, or combinations thereof. In some embodiments, the coating composition 10 includes rheology modifiers to provide the desired non-Newtonian properties. Many different types of rheology modifiers can be used in various embodiments. Non-limiting examples of suitable rheology modifiers include urea-based compounds, laponite propylene glycol solutions, acrylic alkali emulsions, and combinations thereof. The coating composition 10 includes the rheology modifier in an amount of from about 0.01 to about 5 wt. % in an exemplary embodiment, for example, from about 0.5 to about 1.5 wt. %, such as from about 0.75 to about 1.2 wt. %, all based on the total weight of the coating composition 10.

Any of the aforementioned compounds or additional components may be utilized to adjust physical properties of the coating composition 10 to render the coating composition 10 suitable for application utilizing the high transfer efficiency applicator 16 including, but not limited to, viscosity at different shear rates, density, and surface tension. Furthermore, adjustment of properties of the high transfer efficiency applicator 16 may be tuned to improve the application process, such as a nozzle diameter of the high transfer efficiency applicator 16, distance between the high transfer efficiency applicator 16 and the substrate 12, impact velocity of the coating composition 10, movement speed of the print head assembly 22, etc.

A high transfer efficiency applicator 16 is used for ejecting the coating composition 10. The coating composition 10 is ejected from one or more nozzles in an engineered/controlled fashion that creates a fine stream, that may or may not breakup into droplets. The fluid stream is targeted to the substrate 12 such that the jet or drops arrive at specific locations to form a continuous film or pattern on the substrate 12. As a result, there is essentially no overspray (drops missing their target) and nearly 100% transfer efficiency (essentially all paint goes to targeted location). In an exemplary embodiment, the transfer efficiency of the coating composition 10 that ends up deposited on the substrate 12 is 99.9% or greater. Some allowance should be made for start-up and stopping the high transfer efficiency applicator 16. Devices of this type have been referred to as drop-on-demand, stream-on demand, overspray-free, or ultra-high transfer efficiency applicators. The high transfer efficiency applicator 16 stands apart from spray atomization techniques where energy, such as pneumatic, hydraulic, or centrifugal energy, is introduced to create a partially controlled, random distribution of droplet sizes, trajectories, and speeds. Some additional mechanism (electrostatics and or shaping air) may then guide the coating composition 10 droplet cloud to the substrate 12. In the case of paint spray, there is always some overspray and transfer efficiency loss.

In an exemplary embodiment, the high transfer efficiency applicator 16 includes a print head assembly 22 as well as supporting features, such as a mount (not shown), a drive for movement (not shown), etc. The print head assembly 22 may comprise one or more than one nozzle(s) 50 in different embodiments, where the nozzle 50 defines a nozzle orifice. It is to be appreciated that each print head assembly 22 may include more than one nozzle 50, and the different nozzles 50 may have different nozzle orifices in some embodiments. For example, different nozzle orifices may be utilized for applying a coating composition 10 including effect pigments which may require a larger nozzle orifice. The nozzle 50 and associated nozzle orifice may have a nozzle diameter (D) in an amount of from about 0.000001 to about 0.001, alternatively from about 0.000005 to about 0.0005, or alternatively from about 0.00002 to about 0.00018, meters (m). The nozzle orifice may have a nozzle diameter (D) in an amount of at least 0.000001, alternatively at least 0.000005, or alternatively at least 0.00002. The nozzle orifice may have a nozzle diameter (D) in an amount of no greater than 0.001, alternatively no greater than 0.0005, or alternatively no greater than 0.00018. In various non-limiting embodiments, it is contemplated that any value or range of values, both whole and fractional, including and between the aforementioned values may be expressly used herein.

Figure 2:
FIGS. 2, 3, and 4 are overhead views of illustrating different embodiments of a print head assembly including a plurality of nozzles.

Referring to FIG. 2 with continuing reference to FIG. 1, in embodiments, the one or more print head assembly 22 includes a plurality of nozzles 50. The nozzles 50 are oriented perpendicular to a traverse direction 54 that the print head assembly 22 moves. As a result, the spacing of droplets 52 of the coating composition 10 that are ejected from the nozzles 50 is similar to the spacing of the nozzles 50 in the print head assembly 22.

Figure 3:
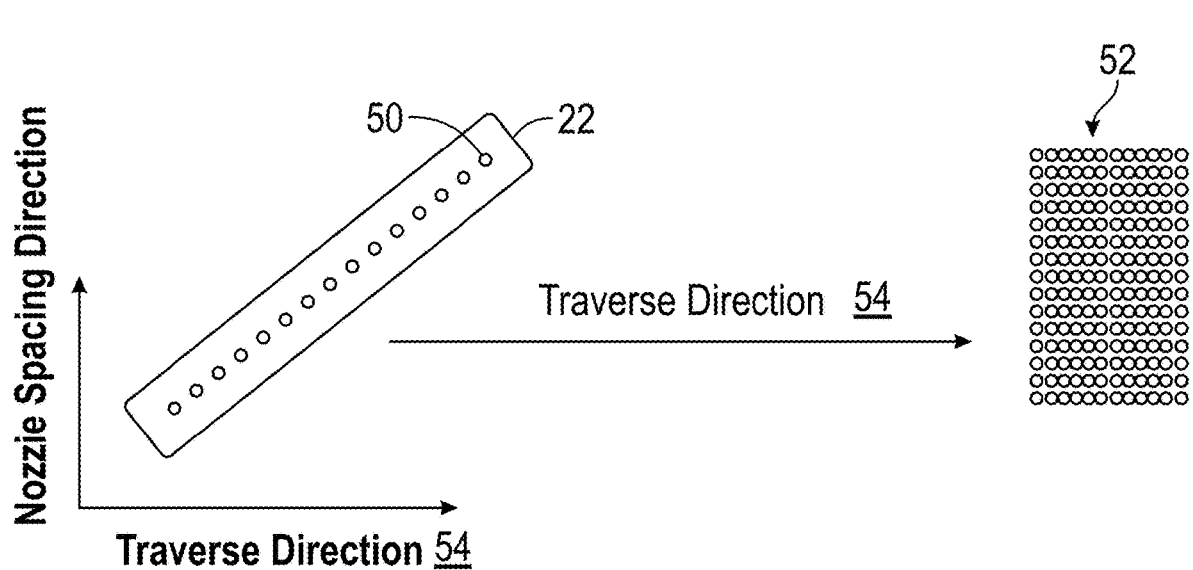

Referring to FIG. 3 with continuing reference to FIGS. 1 and 2, in some embodiments the print head assembly 22 includes a plurality of nozzles 50. The nozzles 50 are oriented diagonal relative to the traverse direction 54 that the print head assembly 22 moves. As a result, the spacing of the droplets 52 of the coating composition 10 that are ejected from the nozzles 50 are decreased relative to the spacing of the nozzles 50 in the print head assembly 22.

Figure 4:
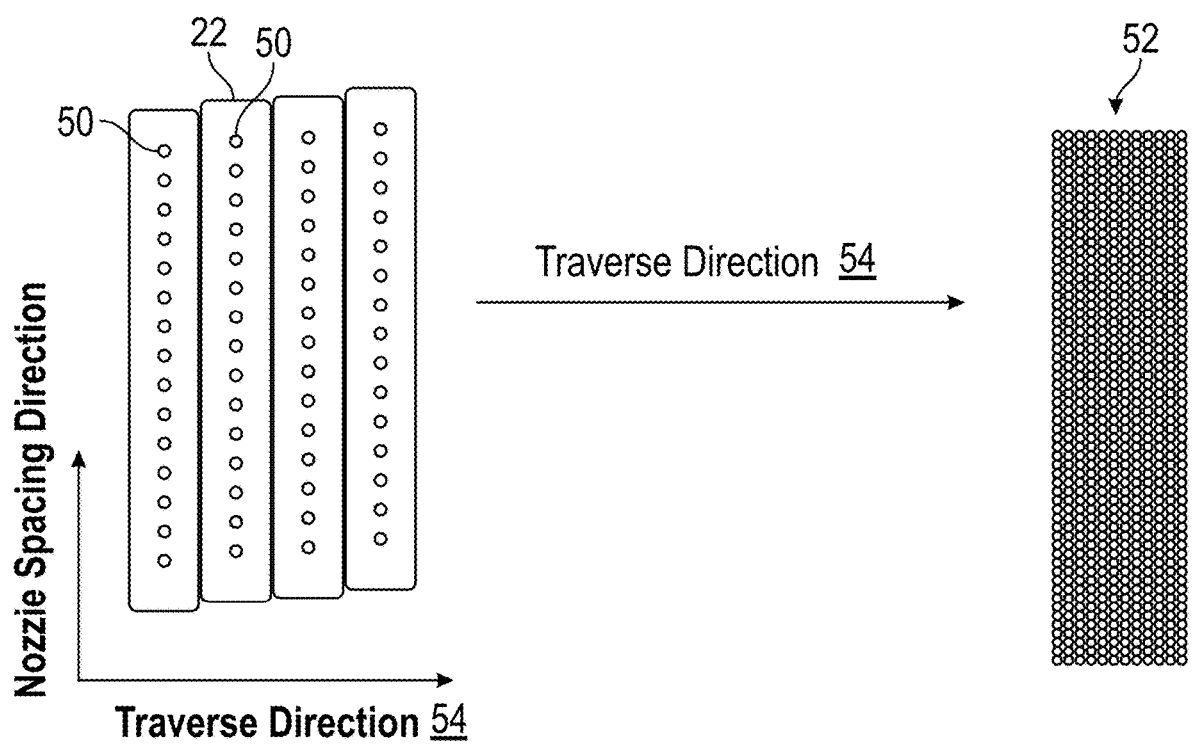

Referring to FIG. 4 with continuing reference to FIGS. 1-3, in some embodiments, four print head assemblies 22 each include a plurality of nozzles 50. The print head assemblies 22 cooperate to form a portion of a high transfer efficiency applicator 16. The nozzles 50 are oriented perpendicular relative to the traverse direction 54 that the print head assembly 22 moves. The print head assemblies 22 are offset from one another such that the spacing between nozzles 50 is reduced overall for the high transfer efficiency applicator 16. As a result, the spacing of the droplets 52 of the coating composition 10 is further decreased relative to the spacing of the nozzles 50 in the print head assembly.

In certain embodiments, a system for applying a coating composition 10 to a substrate 12 utilizing a high transfer efficiency applicator 16 is provided herein. The system includes a print head assembly 22 including a nozzle 50. The nozzle 50 defines a nozzle orifice and may have a nozzle diameter of from about 0.00002 m to about 0.0004 m. The system further includes a reservoir in fluid communication with the one or more print head assemblies 22 and configured to contain the coating composition 10. The coating composition 10 includes a carrier and a binder. The coating composition 10 may have a viscosity as described above, and may have a density of from about 838 kg/m3 to about 1557 kg/m$^3$, a surface tension of from about 0.015 N/m to about 0.05 N/m, and a relaxation time of from about 0.0005 s to about 0.02 s. The one or more high transfer efficiency applicators 16 is configured to receive the coating composition 10 from the reservoir and configured to expel the coating composition 10 through the nozzle 50 to the substrate 12 to form a coating layer 14. It is to be appreciated that ranges for the nozzle diameter, viscosity, density, surface tension, and relaxation time may be defined by any of the ranges described herein. In various non-limiting embodiments, it is contemplated that any value or range of values, both whole and fractional, including and between the aforementioned values may be expressly used herein.

In an exemplary embodiment, the one or more high transfer efficiency applicators 16 may be configured to expel the coating composition 10 through the nozzle 50 to produce an impact velocity of from about 0.2 m/s to about 20 m/s. Alternatively, the one or more high transfer efficiency applicators 16 may be configured to expel the coating composition 10 through the nozzle 50 to produce an impact velocity of from about 0.4 m/s to about 10 m/s. The nozzle 50 may have a nozzle diameter of from about 0.00004 m to about 0.00025 m. The coating composition 10 may be expelled from the one or more nozzles 50 as a droplet 52 having a particle size of at least 10 microns. In various non-limiting embodiments, it is contemplated that any value or range of values, both whole and fractional, including and between the aforementioned values may be expressly used herein.

In certain embodiments, at least 80% of the one or more coating compositions 10 expelled from the one or more nozzles 50 contact the substrate 12. In other embodiments, at least 85%, alternatively at least 90%, alternatively at least 95%, alternatively at least 97%, alternatively at least 98%, alternatively at least 99%, or alternatively at least 99.9% of the one or more coating compositions 10 expelled from the one or more nozzles 50 contact the substrate 12. Without being bound by theory, it is believed that this improves efficiency of application of the coating composition 10, reduces waste generation, and reduces maintenance of the high transfer efficiency applicator 16.

Figure 5:
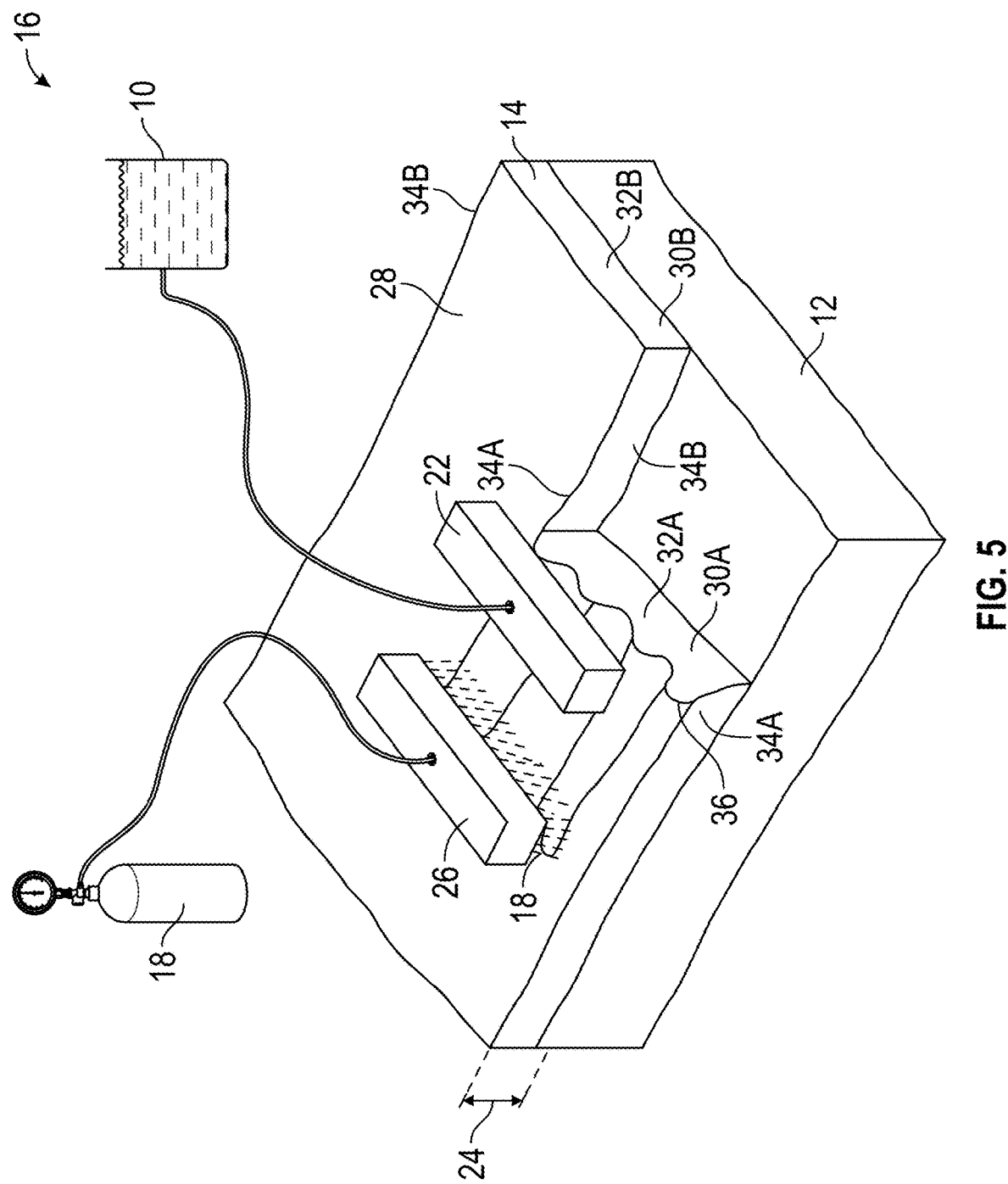

In certain embodiments, at least 80% of the droplets 52 of the coating composition 10 expelled from the one or more nozzles 50 are monodispersed such that the stated percentage of the droplets 52 (at least 80% in the currently described embodiment) have a particle size distribution of less than 20%, where a particle size distribution of less than 20% means the stated percentage of particles have a particle size within 20% of the average particle size, where the particle size is the average diameter of the particle. In other embodiments, at least 85%, alternatively at least 90%, alternatively at least 95%, alternatively at least 97%, alternatively at least 98%, alternatively at least 99%, or alternatively at least 99.9% of the droplets 52 of the coating composition 10 expelled from the one or more nozzles 50 are monodispersed such that the droplets 52 have a particle size distribution of less than 20%, alternatively less than 15%, alternatively less than 10%, alternatively less than 5%, alternatively less than 3%, alternatively less than 2%, alternatively less than 1%, or alternatively less than 0.1%. While conventional applicators rely on atomization to form "a mist" of atomized droplets of a coating composition having a dispersed particle size distribution, the monodispersed droplets 52 formed by the high transfer efficiency applicators 16 can be directed to the substrate 12 thereby resulting in an improved transfer efficiency relative to conventional applicators. In various non-limiting embodiments, it is contemplated that any value or range of values, both whole and fractional, including and between the aforementioned values may be expressly used herein.

In certain embodiments, at least 80% of the droplets 52 of the coating composition 10 expelled from the one or more nozzles 50 toward the substrate 12 remain as a single droplet after contact with the substrate 12. In other embodiments, at least 85%, alternatively at least 90%, alternatively at least 95%, alternatively at least 97%, alternatively at least 98%, alternatively at least 99%, or alternatively at least 99.9% of the droplets 52 of the coating composition 10 expelled from the one or more nozzles 50 toward the substrate 12 remain as a single droplet after contact with the substrate 10. Without being bound by theory, it is believed that splashing of the coating composition 10 resulting from impact with the substrate 12 can be minimized or eliminated by applying the coating composition 10 utilizing the one or more high transfer efficiency applicators 16. In various non-limiting embodiments, it is contemplated that any value or range of values, both whole and fractional, including and between the aforementioned values may be expressly used herein.

In certain embodiments, at least 80% of the droplets 52 of the coating composition 10 expelled from the one or more nozzles 50 toward the substrate 12 remain as a single droplet after expulsion from the nozzle 50 of the one or more high transfer efficiency applicators 16. In other embodiments, at least 85%, alternatively at least 90%, alternatively at least 95%, alternatively at least 97%, alternatively at least 98%, alternatively at least 99%, or alternatively at least 99.9% of the droplets 52 of the coating composition 10 expelled from the one or more nozzles 50 toward the substrate 12 remain as a single droplet after expulsion from the nozzle 50 of the one or more high transfer efficiency applicators 16. Without being bound by theory, it is believed that the formation of satellite droplets can be reduced or eliminated by applying the coating composition 10 utilizing the one or more high transfer efficiency applicators 16. Impact velocity and nozzle diameter influence satellite droplet formation. Satellite droplet formation may be reduced by considering the impact velocity and the nozzle diameter. In various non-limiting embodiments, it is contemplated that any value or range of values, both whole and fractional, including and between the aforementioned values may be expressly used herein.

The coating composition 10 is pressurized and ejected from the high transfer efficiency applicator 16 toward the substrate 12 to form the coating layer 14 on the substrate 12. The print head assembly 22 does not touch or make contact with the substrate 12 during application of the coating composition 10, and, accordingly, remains spatially separate from the substrate 12 during application of the coating layer 14. In an exemplary embodiment, the print head assembly 22 is positioned or located at a distance of from 1 to about 30 millimeters from the substrate 12 during application of the coating composition 10. The print head assembly 22 may be controlled to move over the substrate 12, making a plurality of subsequent passes to provide the coating layer 14 overlying the substrate 12, where the coating layer 14 and the substrate 12 may both be wider than the print head assembly 22. In an alternate embodiment, a plurality of print head assemblies 22 may be utilized to apply the coating layer 14. In a further embodiment, the substrate 12 moves relative to a stationary print head assembly 22 and/or high transfer efficiency applicator 16.

The viscosity of the coating composition 10 is reduced by shear rate to facilitate the coating composition 10 being ejected from the high transfer efficiency applicator 16, as discussed above. However, once the coating layer 14 is formed, the shear rate is removed from the coating layer 14 and the viscosity increases. Therefore, the coating layer 14 does not flow from the areas of overlap in a sufficient amount to level the coating layer 14, where the areas of overlap refers to areas between adjacent high transfer efficiency applicator passes over the substrate 12. In a similar manner, the coating layer 14 does not flow into the low areas formed where adjacent material was laid down with a small gap therebetween in a sufficient quantity to level the coating layer 14.

After the coating layer 14 is formed on the substrate 12, a gas 18 is ejected from a gas jet 20 onto the coating layer 14. The coating layer 14 has a coating layer thickness 24, and the coating layer thickness 24 may vary over a length and/or width of a coating layer surface 28. The gas 18 impinges on the coating layer 14 and moves the coating layer 14 at the coating layer surface 28 with the force of the impingement, thereby leveling peaks and valleys of the coating surface 28. In this regard, the coating layer surface 28 becomes smoother (i.e., has reduced variation in the coating layer thickness 24) after the gas impinges on the coating layer 14.

Reference is made to FIG. 5, with continuing reference to FIGS. 1-4, where FIG. 5 is an upper perspective view of the print head assembly 22, and a gas jet 20 separated from the print head assembly 22. The gas jet 20 is housed in a gas jet head 26, where the gas jet 20 itself is not visible in FIG. 5 due to the upper perspective view. The print head assembly 22 is shown making a second pass over the substrate 12, where the coating layer 14 from the first pass is smooth. The print head assembly 22 produces an uneven coating layer 14 where the variation in the coating layer thickness 24 is reduced as the coating layer 14 passes under the gas jet head 26, because the coating layer 14 is smoothed by pressure applied by the gas jet 20. FIG. 5 illustrates two adjacent coating lines 30A, 30B, where each coating line 30A, 30B includes a coating line center 32A, 32B between two coating line edges 34A, 34B. There is an illustrated imperfection 36 between the coating layer 14 laid down by the high transfer efficiency applicators 16 in the print head assembly 22, where the high transfer efficiency applicators 16 are not visible in FIG. 5.

Figure 6:
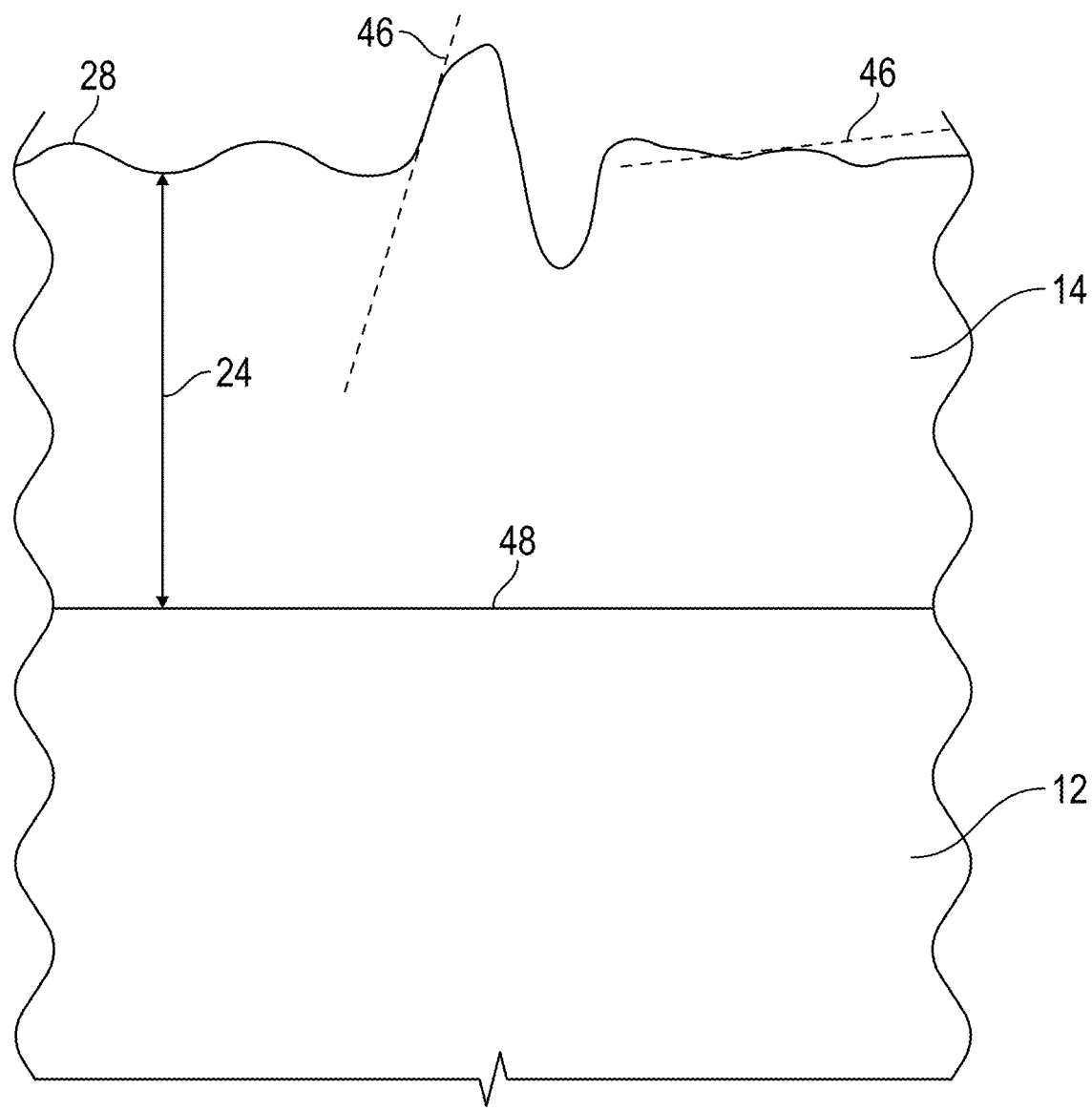
FIG. 6 is a side sectional view of a coating layer overlying a substrate.

The imperfection 36 is a noticeable variation in the coating layer thickness 24, and may result at the junction between two different high transfer efficiency applicators 16, including the junction between the high transfer efficiency applicators 16 on different successive passes over the substrate 12. The imperfection 36 may form a visible line within each coating line 30A, 30B or a visible line between the successive coating lines 30A, 30B, or both. The most obvious variations in the coating layer thickness 24 is a rapid change in the coating layer thickness 24. This is variation in the coating layer thickness 24 over a short distance, which is a slope of the coating layer thickness. Referring to FIG. 6, with continuing reference to FIGS. 1-5, the slope 46 is determined by a tangent line positioned at a point on the coating layer surface 28, where a tangent line parallel to a substrate surface 48 is defined as having a slope 46 of zero (0). Slope is a rise over a run, where the run is measured parallel to the substrate surface 48. The tangent line used to determine the slope 46 is illustrated in FIG. 6, which is a cross sectional view of the coating layer 14 and substrate 12. This illustration of the slope 46 is not illustrated on other drawings, but the concept remains the same as illustrated in FIG. 6.

The slope 46 of the coating layer thickness is measured over the coating layer surface 28, as described above. For example, a change of about 2 microns in the coating layer thickness 24 over a distance of 100 millimeters (i.e., a slope 46 of 2 microns (μm) over 100 millimeters (mm)=2/100=0.02 μm/mm) would probably not be visible to the naked eye, but a change of about 2 microns in the coating layer thickness 24 over a distance of about 2 millimeters (i.e., a slope 46 of about 2/2=1 μm/mm) probably would be visible to the naked eye. As such, the slope 46 of an imperfection is defined as the change in the coating layer thickness 24 over a distance, measured along the coating layer surface 28, and is generally referenced herein using the units of μm/mm. Reference to the slope 46 herein means a slope 46 of the coating layer thickness 24 that extends for at least about 20 millimeters. Some coatings may have anomalies that produce a high slope over a short distance, such as if a piece of dust were encased in the coating layer 14. A slope 46 that extends over a distance is more apparent to the eye, and suggests a coating technique that could be improved to reduce the slope 46 that extends over a distance.

In an exemplary embodiment, the imperfection 36 is a variation in the coating layer thickness 24 of about 1 micron or more, but in alternate embodiments the imperfection 36 may be a variation in the coating layer thickness 24 of about 1.5 microns or more, or about 2 microns or more, or about 3 microns or more. This variation in the coating layer thickness 24 is measured over a distance to produce a slope 46, as discussed above. The slope 46 of the coating layer thickness 24 variation may be more visible if that slope 46 is in a direction perpendicular to the direction of movement of the print head assembly 22, as opposed to a slope 46 in a direction parallel to the movement of the print head assembly 22. For example, the slope 46 of a variation in the coating layer thickness of about 0.2 μm/mm in a direction perpendicular to the movement of the print head assembly 22 may be visible to the naked eye, but that slope 46 may need to be about 0.4 μm/mm in a direction parallel to the movement of the print head assembly 22 to be comparably visible to the naked eye. Some people may be able see a variation in the coating layer thickness 24 with a slope 46 of about 0.1 μm/mm with the naked eye, as long as the slope 46 of the overall variation in the coating layer thickness 24 persists for about 0.5μ. In an exemplary embodiment, the print head assembly 22 (prior to application of the gas jet 20) produces a coating layer 14 with variations in the coating layer thickness 24 having a slope 46 of about +/−0.4 μm/mm or more, but in alternate embodiments the print head assembly produces a coating layer 14 with variations in the coating layer thickness 24 having a slope 46 of about +/−0.6 μm/mm or more, or about +/−0.8 μm/mm or more, or about 1 μm/mm more.

The coating composition 10 is applied in a liquid form, and there is very little if any solvent loss during the application process. Therefore, a coating composition solvent concentration is about the same as a coating layer solvent concentration prior to impingement with the gas, where "about the same" means within about 1 wt. %, based on a total weight of the named component (the coating composition and coating layer 10, 14 in this case.) Therefore, if the coating composition solvent concentration were 35 wt. %, based on the total weight of the coating composition 10, the coating layer solvent concentration would be from about 34 to about 35 wt. %, based on a total weight of the coating layer 14. As such, the overall composition of the coating composition 10 and the coating layer 14 is about the same, prior to impingement with the gas, where the solvent is the most volatile component in the coating composition and coating layer 10, 14. As such, the non-Newtonian properties of the coating composition 10 are about the same as for the coating layer 14, and the above description of the components and properties of the coating composition 10 applies equally to the coating layer 14, prior to impingement with the gas. However, the impinging gas 18 may change the coating layer solvent concentration, so the coating layer solvent concentration may be changed by about 1 wt. % or more by the impinging gas 18, based on the total weight of the coating layer 14. Gas flow over a solvent tends to result in some evaporation of that solvent.

The impinging gas 18 should impinge on the coating layer 14 within a brief time after the coating composition 10 has been applied. In an exemplary embodiment, the impinging gas 18 impinges on the coating layer 10 within about 5 seconds after application of the coating layer 10, for example, within about 1 second, or within about 0.5 seconds after application. The force of the impinging gas 18 may be adjusted to a point where the coating layer 14 is smoothed, but not blown off of the substrate 12. For example, the impinging gas 18 may move the coating layer 14 such that the coating layer thickness 24 varies by a slope 46 of about +/−0.2 μm/mm or less. In alternate embodiments, the variation in the coating layer thickness 24 varies by a slope 46 of about 0.4 μm/mm or less, or a slope 46 of about 0.6 μm/mm or less, after being impinged with the gas 18.

To facilitate rapid application of the impinging gas 18 upon the coating layer 14 after it has been applied, the gas jet head 26 may be connected to the print head assembly 22 (as illustrated in FIG. 1), or the gas jets 20 may be a positioned or incorporated within the print head assembly 22 (not illustrated.) However, in alternate embodiments, the gas jet head 26 and the print head assembly 22 may be separate, independent components, as illustrated in FIG. 5.

The force of the impinging gas 18 may be adjusted using several techniques, including but not limited to adjusting the pressure at the gas jet 20, adjusting the size and/or shape (circular, slit, etc.) of the nozzle of the gas jet 20, adjusting the number of gas jets 20 utilized, adjusting the distance between the high transfer efficiency applicator 16 and the coating later 14, and adjusting the angle of the gas jets 20 relative to the substrate 12. In an exemplary embodiment, an air pressure of from about 65 kilopascals (kPa) to about 350 kPa (10 to 50 pounds per square inch (PSI)) may be applied to the gas jet head 26, for example, about 135 kPa to about 280 kPa (20-40 PSI), such as from about 170 kPa to about 250 kPa (25-35 PSI). In an exemplary embodiment, the pressure supplied to the gas jet 20 is controlled to keep the gas flow laminar, as opposed to turbulent flow, before the gas impinges on the coating layer 14. The gas jet 20 may be set at an angle of from about 3 to about 5 degrees from perpendicular to the coating layer surface 28 to better control the smoothing feature of the gas impingement. The gas 18 may be directed towards the coating layer 14 at a temperature of from about 20 to about 40 degrees Celsius (° C.) in an exemplary embodiment, but other temperatures may be utilized in alternate embodiments. The distance between the high transfer efficiency applicator 16 and the coating later 14 may be about 2.5 cm (1 inch) in an exemplary embodiment, but other distances are also possible. The width of the gas impinging on the coating layer surface 28 may be about 7.6 cm (3 inches) in an exemplary embodiment, but other widths are also possible. Furthermore, the amount of movement, or smoothing, of the coating layer surface 28 may be modified by adjusting the time between when the coating layer 14 is applied and when the impinging gas 18 impinges on the coating layer 14, because the viscosity of the coating layer 14 begins increasing after application.

In an exemplary embodiment, the smoothed coating layer 14 has a coating layer thickness 24 that varies in an amount that is not easily perceptible to the human eye. In an exemplary embodiment, the coating layer thickness 24 varies by no more than about +/−0.2 µm/mm after the impinging gas 18 impinges upon the coating layer 14. However, in alternate embodiments, the coating layer thickness 24 varies by no more than about +/−0.4 µm/mm, such as no more than about +/−0.6 µm/mm after the coating layer 14 has been smoothed.

The gas jet 20 may be set with different impinging forces for different portions of the print head assembly 22. For example, the gas jet 20 may be formed to provide an edge force along the coating line edges 34A, 34B, and a center force along the coating line centers 32A, 32B. The imperfection 36 may be greater at the coating line edges 34A, 34B due to minor misalignment of subsequent passes of the print head assembly 22 over the substrate 12, so a greater leveling force may be desirable at the coating line edges 34A, 34B relative to the coating line centers 32A, 32B (i.e., the edge force of the impinging gas 18 may be greater than the center force of the impinging gas 18). Variations in the force may be produced by using different nozzle sizes for different gas jets 20 along the print head assembly 22, for example, but other techniques as mentioned above may also be utilized.

In an exemplary embodiment, the impinging gas 18 is air, but other gases may be utilized in alternate embodiments. For example, nitrogen is inert, and as such may provide less surface reaction. Some coating compositions 10 may benefit from protection from the oxygen present in air for a period after application. However, air is readily available and inexpensive, and many different types of coatings are available that are designed for exposure to air after application.

The coating layer 14 may be a first coating, a second coating, or any other coating of a substrate 12. In many embodiments, multiple layers of coating are applied to a substrate 12, and the methods described herein may be utilized to apply any one or more of those layers. The coating layer 14 may be cured in a manner known to those of skill in the art.

Figure 7:
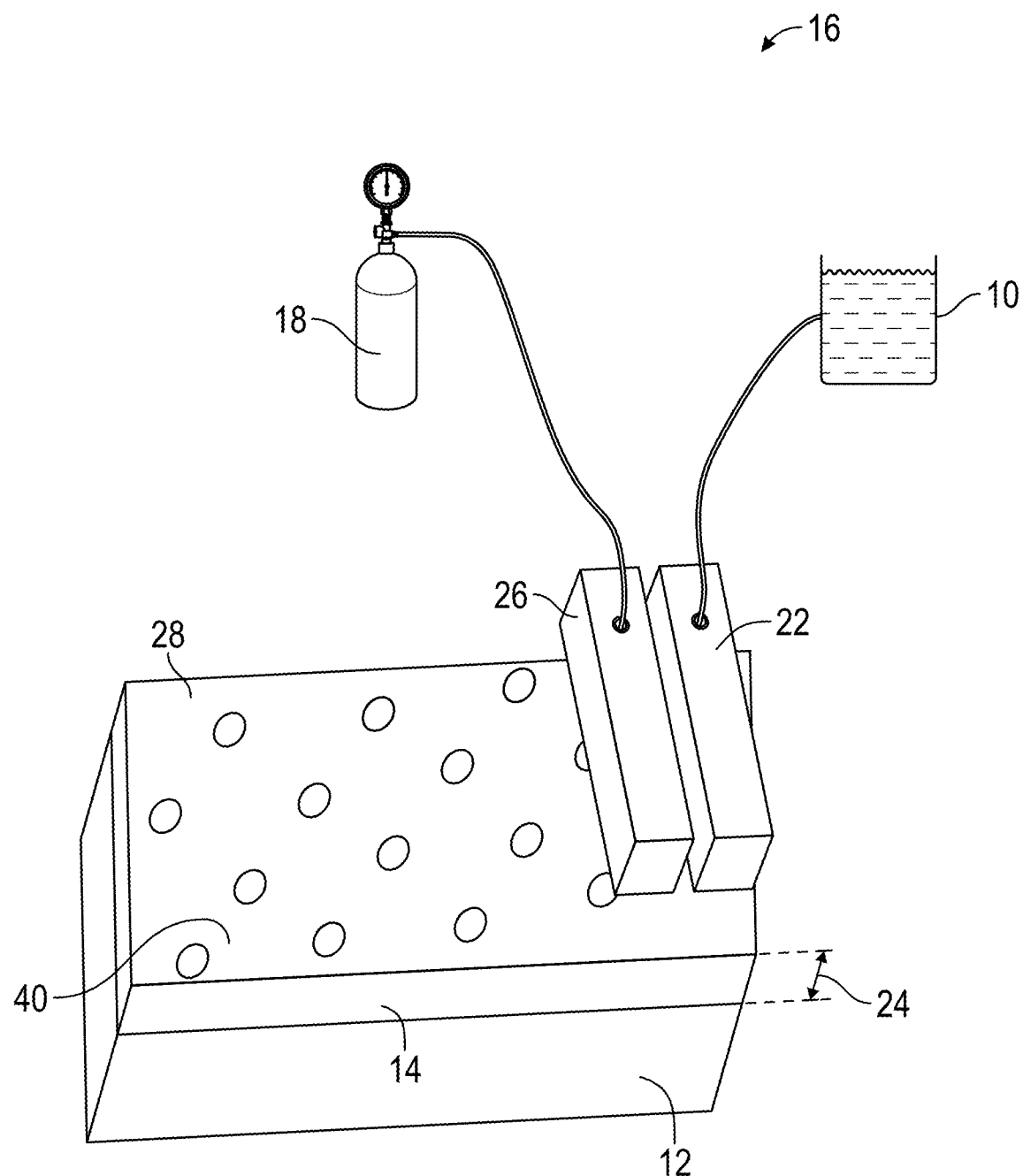

Reference is made to FIG. 7, with continuing reference to FIGS. 1-6. In an alternate embodiment, the impinging gas 18 may be delivered in an uneven manner, such as being pulsed, so the coating layer 14 is formed with a textured surface 40. As such, in an exemplary embodiment the impinging gas 18 provides a pulsed force to the coating layer 14. A "textured surface" 40, as used herein, means a surface with an uneven coating layer thickness 24, where the uneven coating layer thickness 24 is visible to the naked eye. As such, the coating layer thickness 24 of a textured surface 40 varies by at least about +/−0.2 µm/mm, or least about +/−0.4 µm/mm, or at least about +/−0.6 µm/mm in alternate embodiments. The textured surface 40, independent of or combined with appropriate effect pigments, may provide a three-dimensional appearance to the coating layer 14. The viscosity of the coating layer 14 increases when left on the substrate 12, as discussed above, so the textured surface 40 produced by the impinging gas 18 may remain in the coating layer 14 through curing. A pulsed impinging gas 18 may provide the textured surface 40 with a dimpled appearance, as illustrated in FIG. 7. Alternatively, the impinging gas 18 may be applied at a greater pressure in one area of the coating line 30A than in adjacent areas of the coating line 30A, so the coating layer 14 has a lined appearance, where the lined appearance is regular and repeatable (not illustrated). Many other types of textured surfaces 40 may be produced in alternate embodiments.

EXAMPLES

FIGS. 8A-13A are 3-dimensional plots illustrating the coating layer surface 28 created using phase step deflectometry (PSD) measurements. The PSD images accentuate the coating layer surface 28 and present variations in elevation (coating layer thickness 24) at an increased scale relative to the length and width of the image. As such, the vertical (Z) axis is measured in microns (µm), and the length and width (X and Y) axes are measured in millimeters (mm). The accentuation of the Z axis presents flaws in the coating layer 14 more dramatically than a standard image. The images in FIGS. 8A-13B were measured with an Optimap™ PSD device. FIGS. 8B-13B are side sectional views of the plots in FIGS. 8A-13AQ, with an arrow illustrating a coating layer interface 42 at the location where subsequent coating lines were applied. FIGS. 8A-13B are actual measured data where the pressure of a gas jet 20 positioned over the coating layer interface 42 was varied in different FIGS. The coating layer 14 overlies a substrate, which is not shown in the images but lies below the 3-dimensional plot in each of FIGS. 8A-13B. The slope 46, as illustrated in FIG. 6 and described below, is generally referenced in the description of FIGS. 8A-13B below.

Figure 8A:
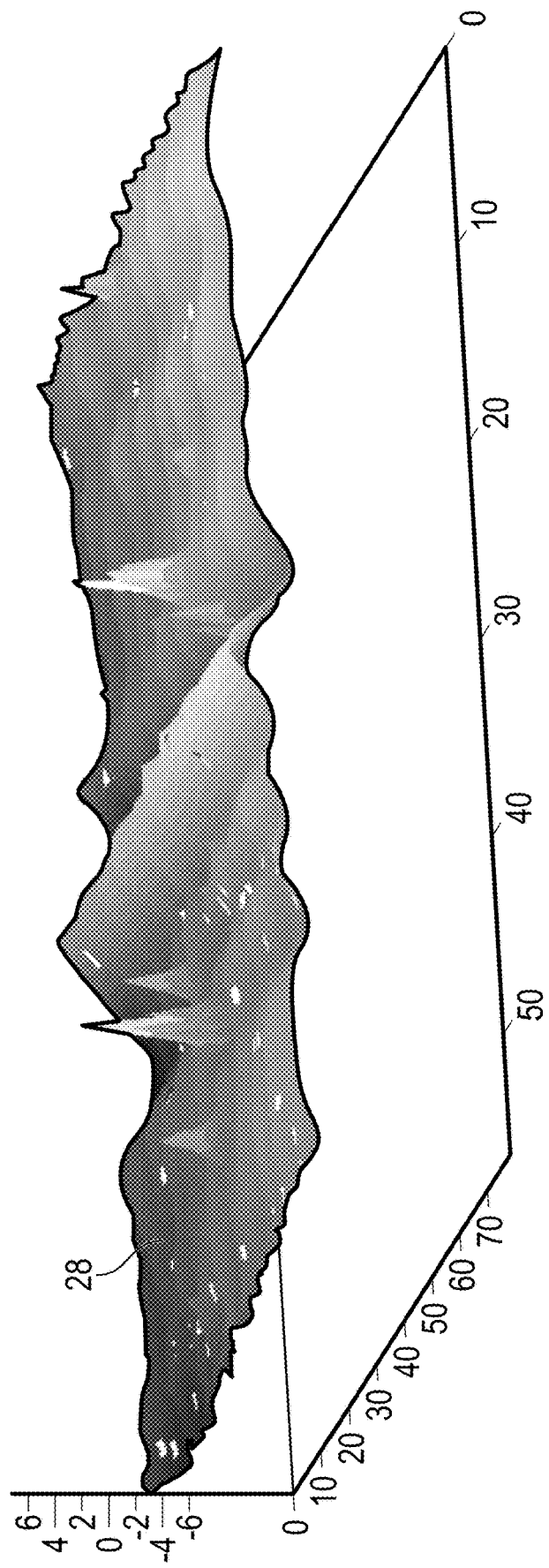
Figure 8B:
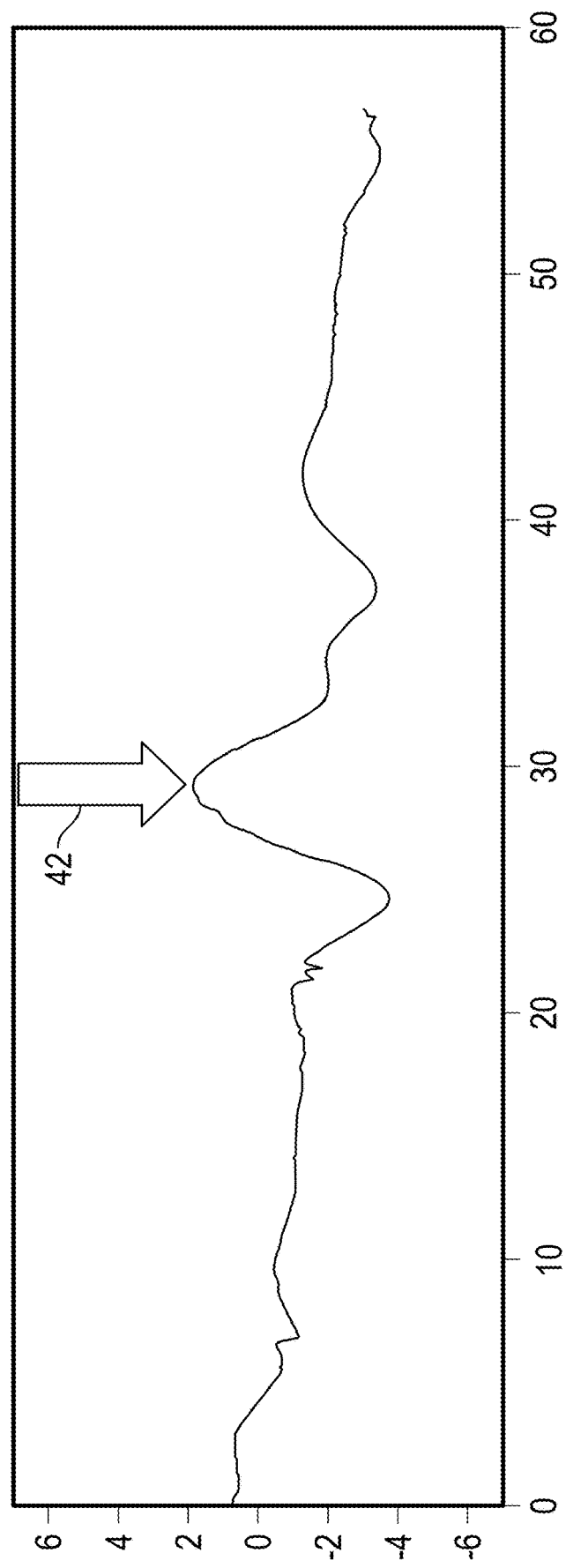
Figure 9A:
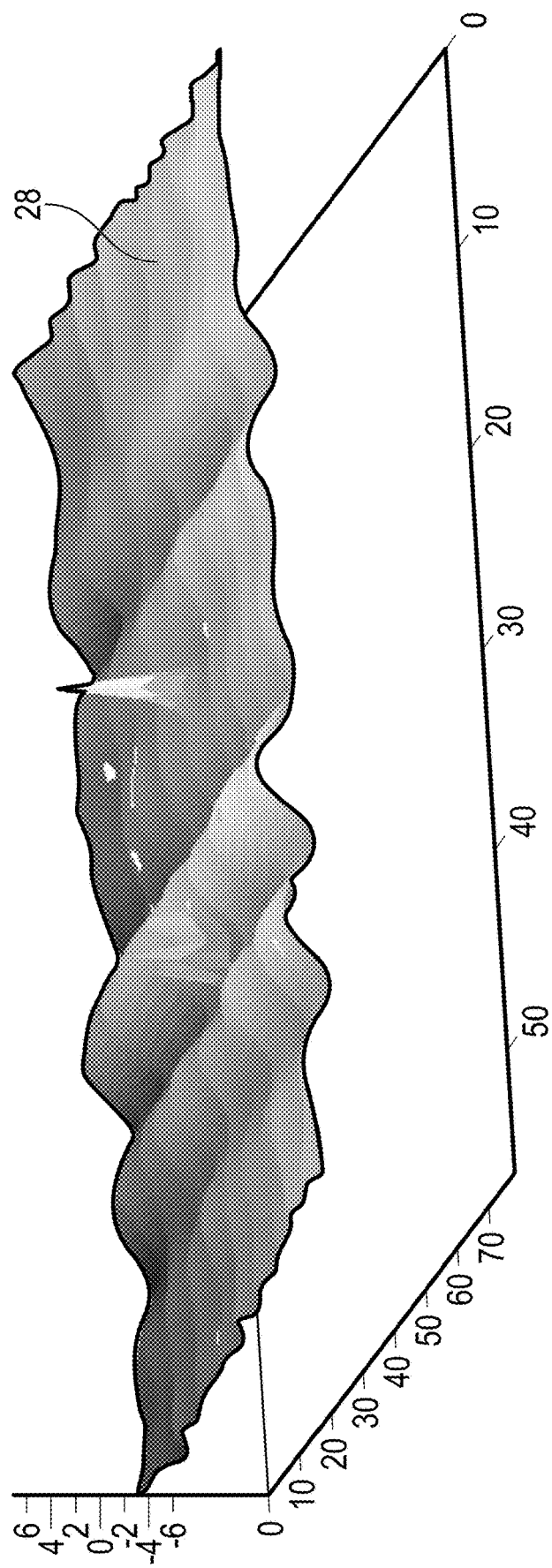
Figure 9B:
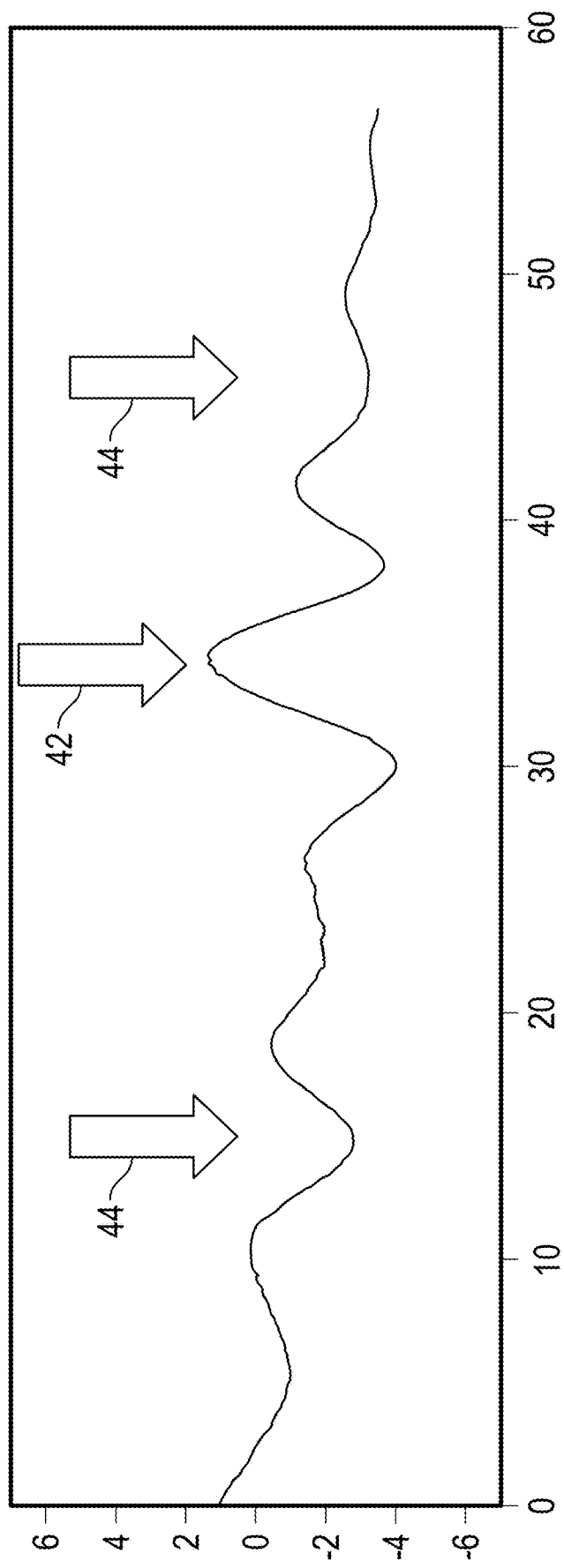
Figure 10A:
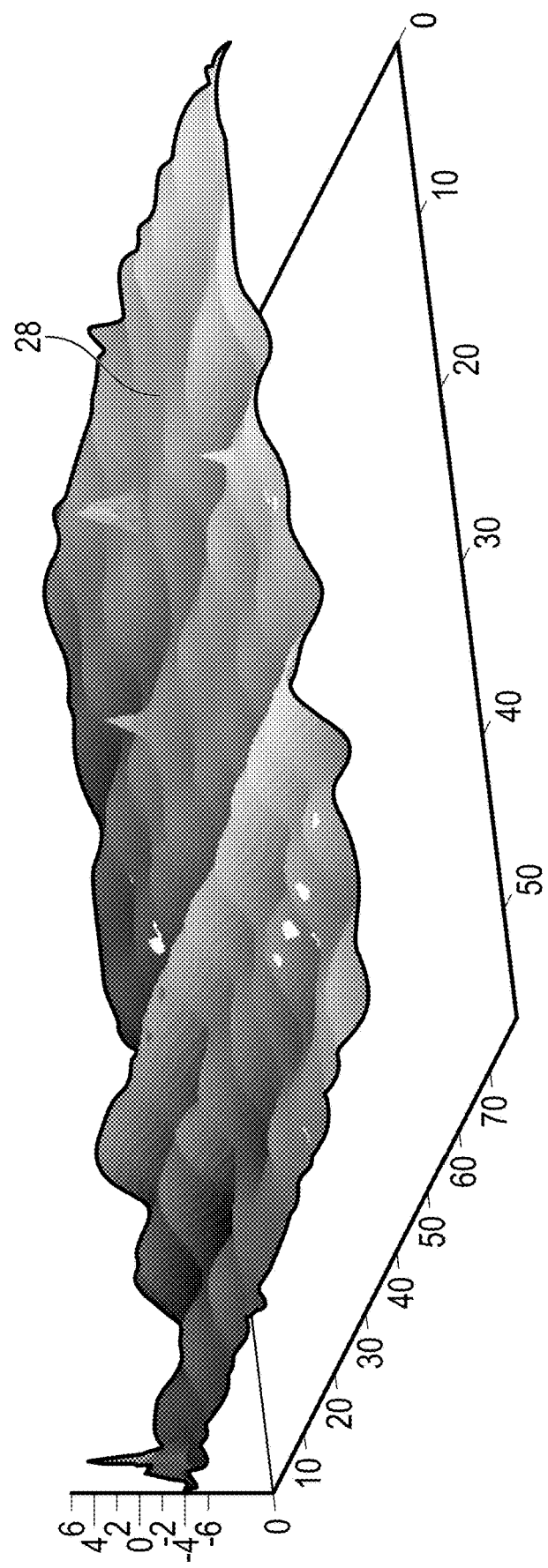
Figure 10B:
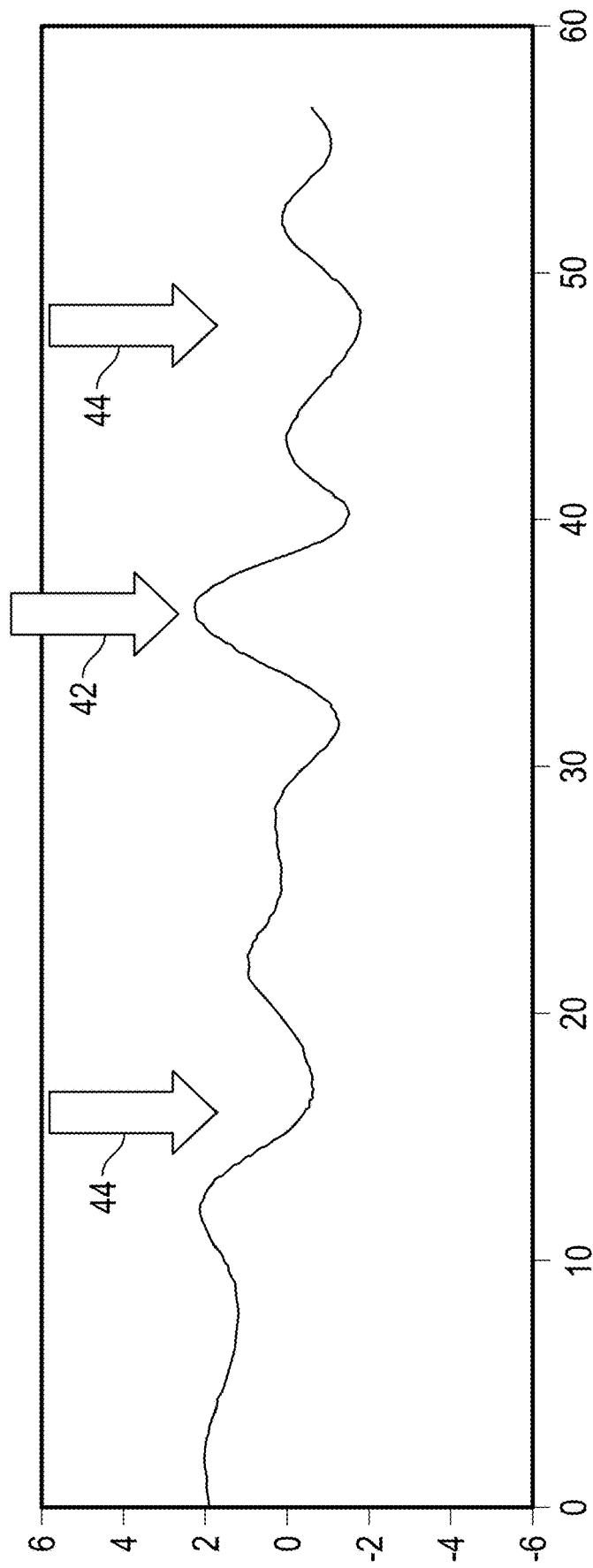
Figure 11A:
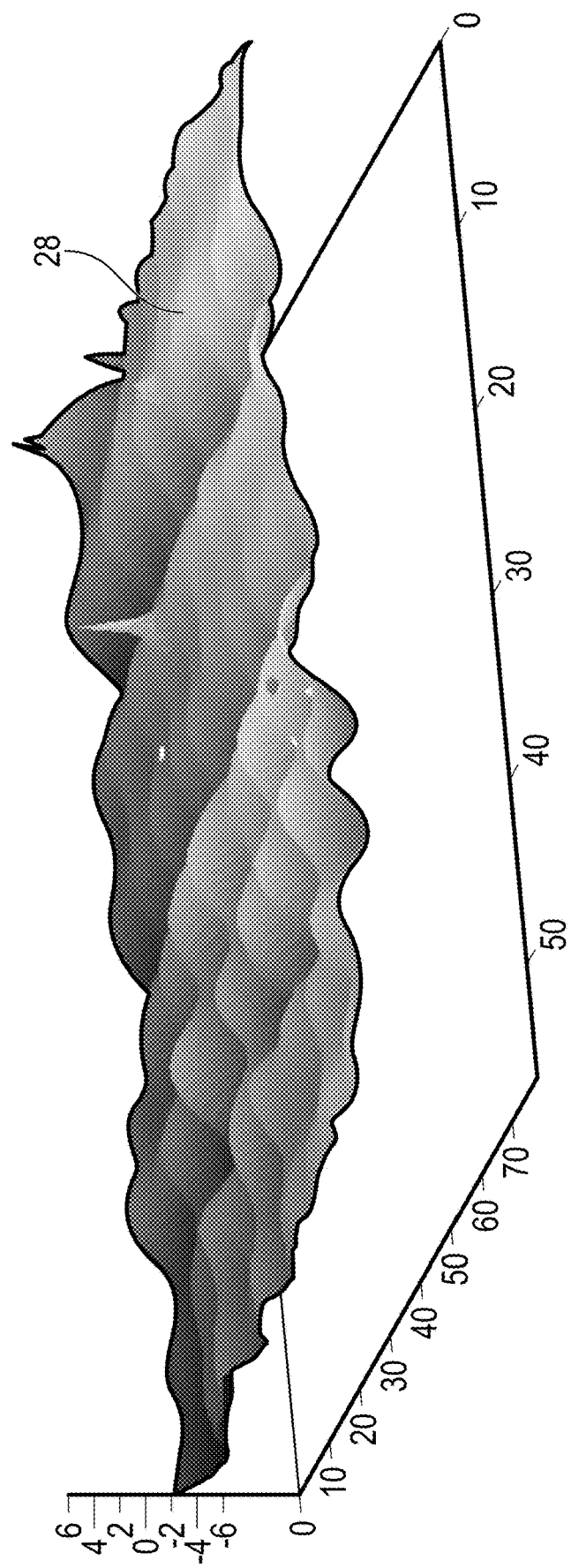
Figure 11B:
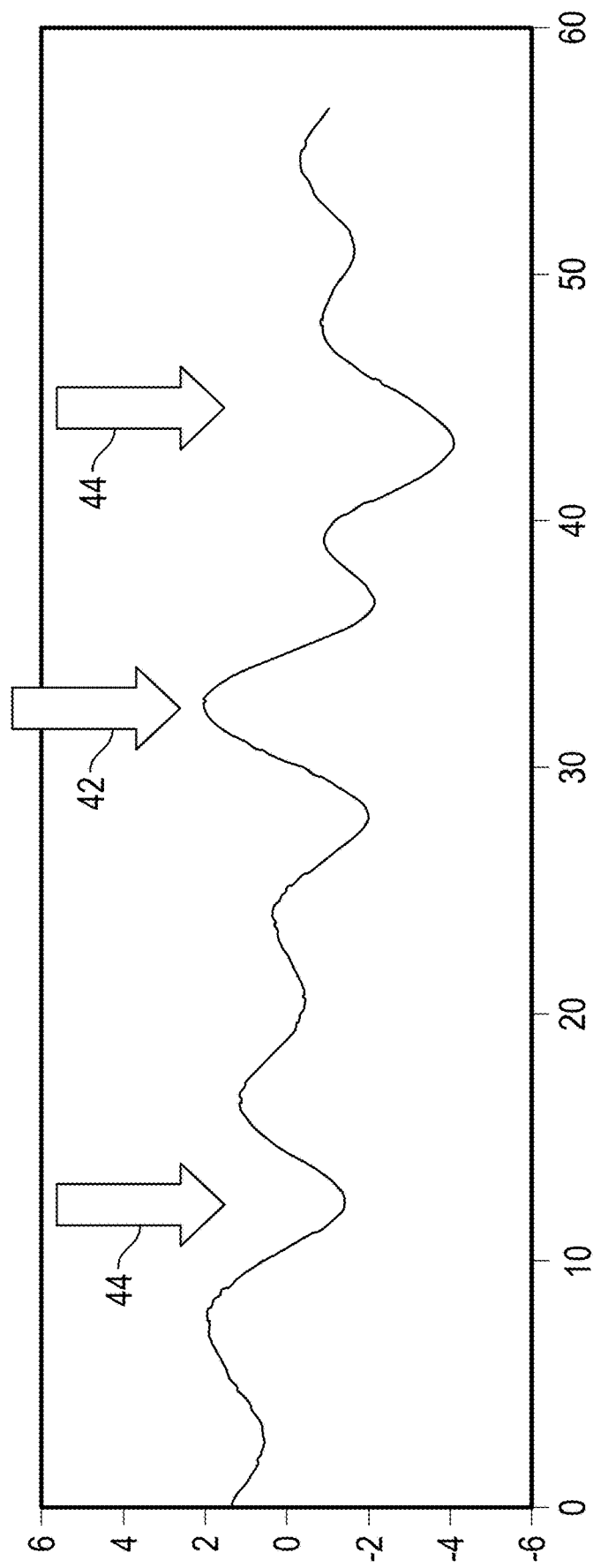
Figure 12A:
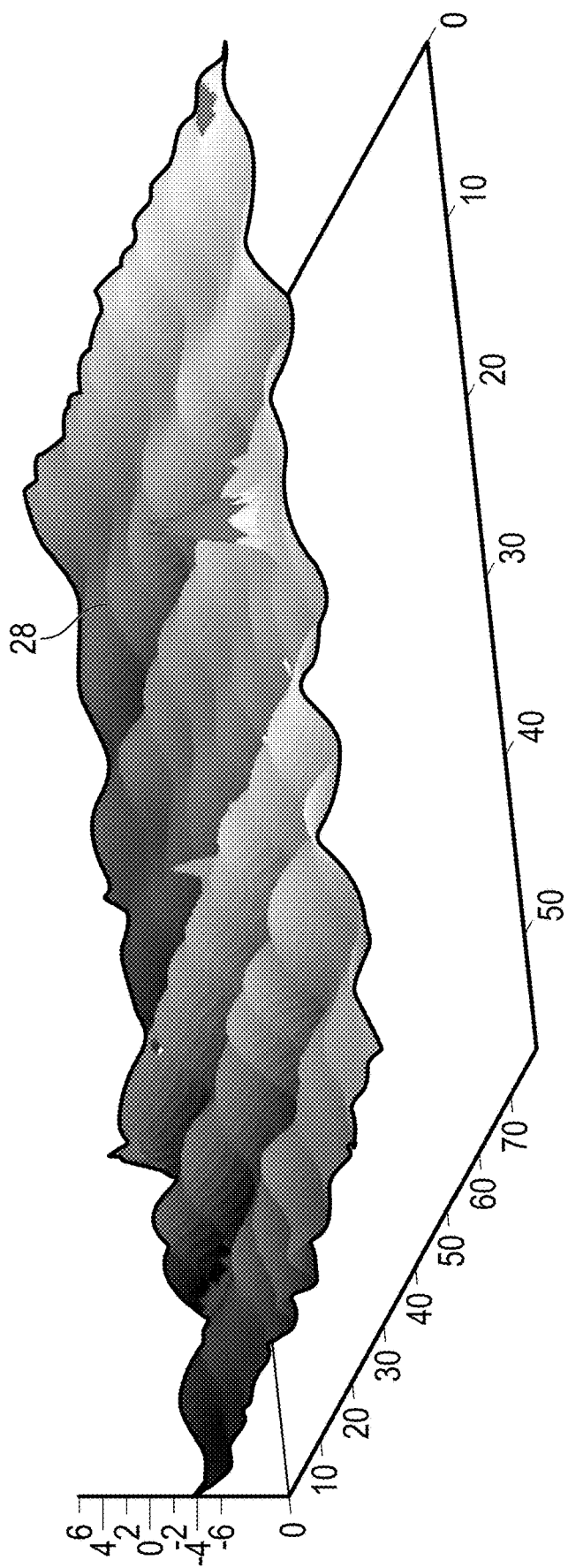
Figure 12B:
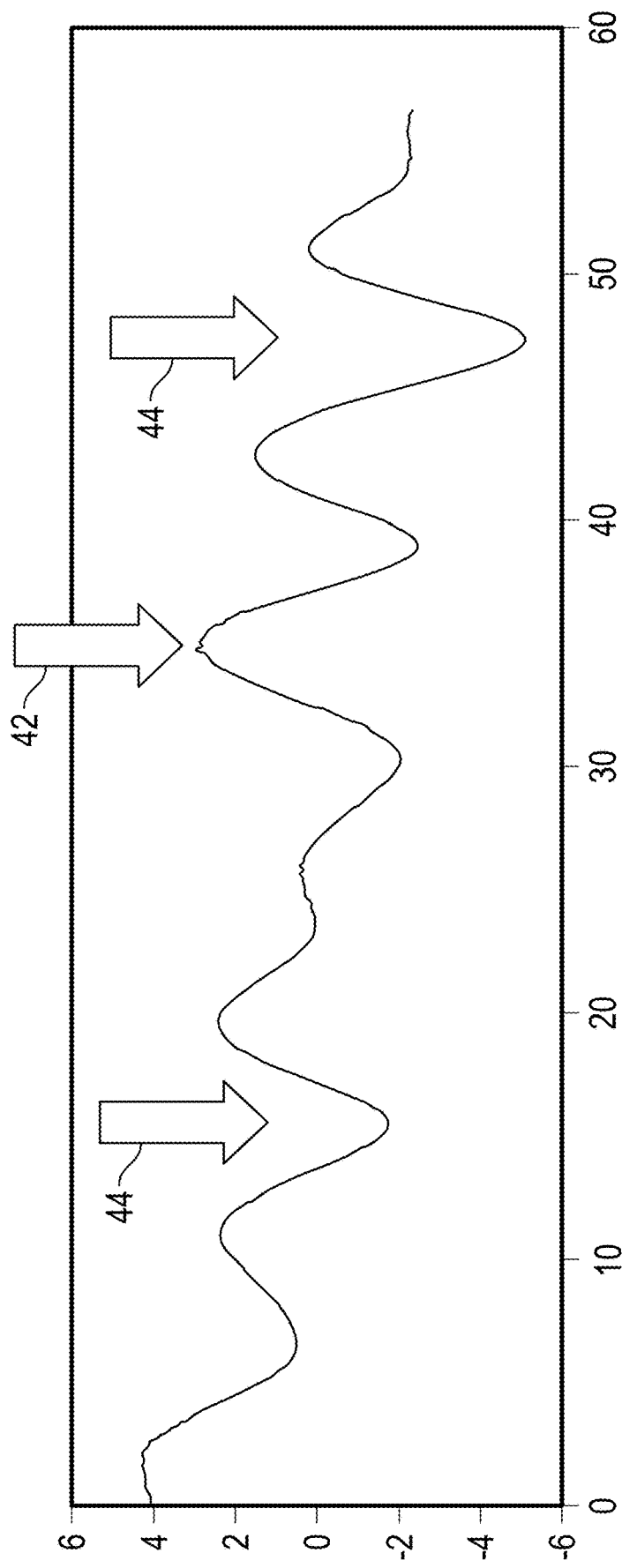

In FIGS. 8A and 8B, no gas jet 20 was applied. In FIGS. 9A and 9B, the gas jet 20 was applied at a pressure of 24 PSI (165 kPa). In FIGS. 10A and 10B, the gas jet 20 was applied at a pressure of 28 PSI (193 kPa). In FIGS. 11A, 11B, 12A, and 12B, the gas jet 20 was applied at a pressure of 30 PSI (207 kPa), where FIGS. 11A and 12A are at different locations to provide a sense of the variation found even with a constant gas jet pressure. Finally, in FIGS. 13A and 13B, the gas jet 20 was applied at a pressure of 32 PSI (221 kPa). The gas jet application area 44 is shown underneath the side sectional views at the bottom of FIGS. 8B-13B, where the vertical lines of the gas jet application area 44 show the outer edges of where the gas jet 20 was applied. The number "0" on the vertical (Z) axis FIGS. 8A-13B indicates the average coating layer thickness 24. Therefore, a point on the vertical (Z) axis with the number "1" indicates the coating layer thickness 24 at that point was 1 micron greater than the average coating layer thickness. The plots include some anomalies where the coating layer thickness 24 shows a sharp rise or decline at a single point, and these anomalies are not considered in this analysis.

Figure 13A:
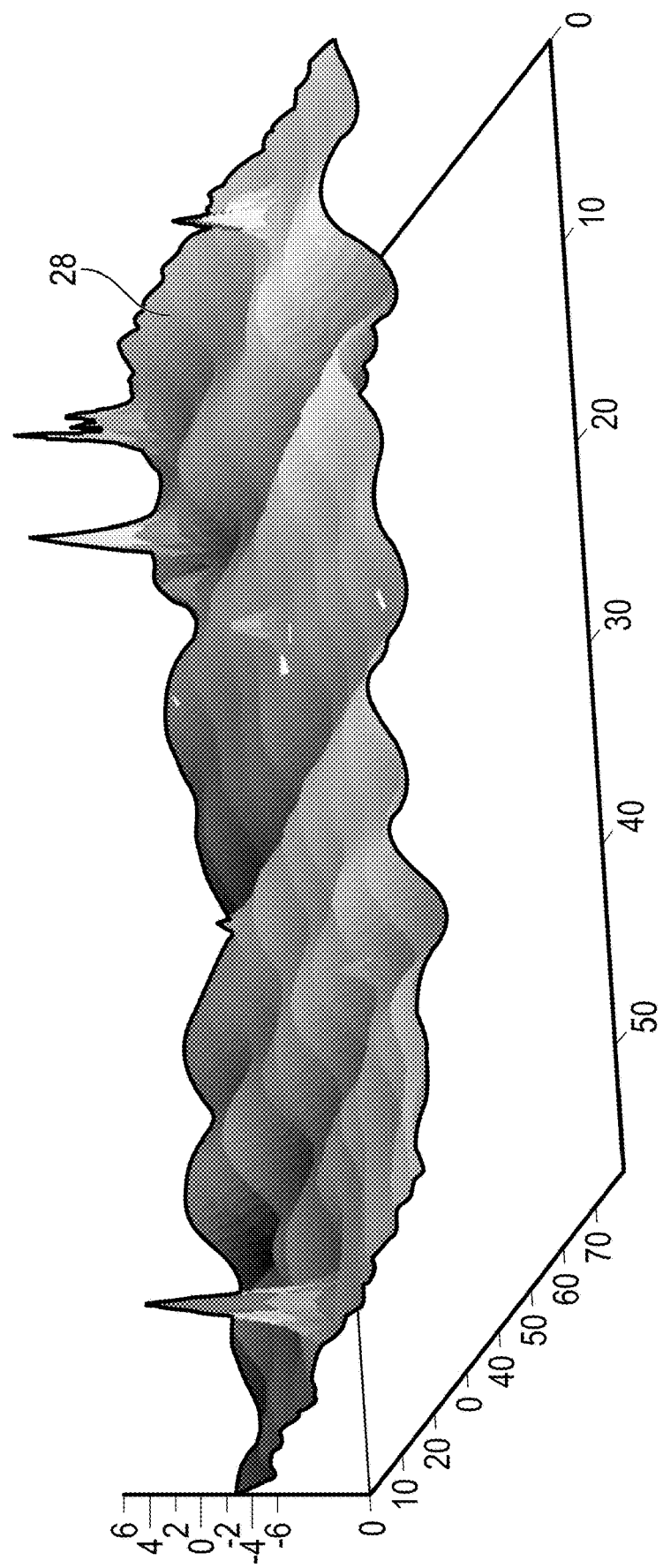
Figure 13B:
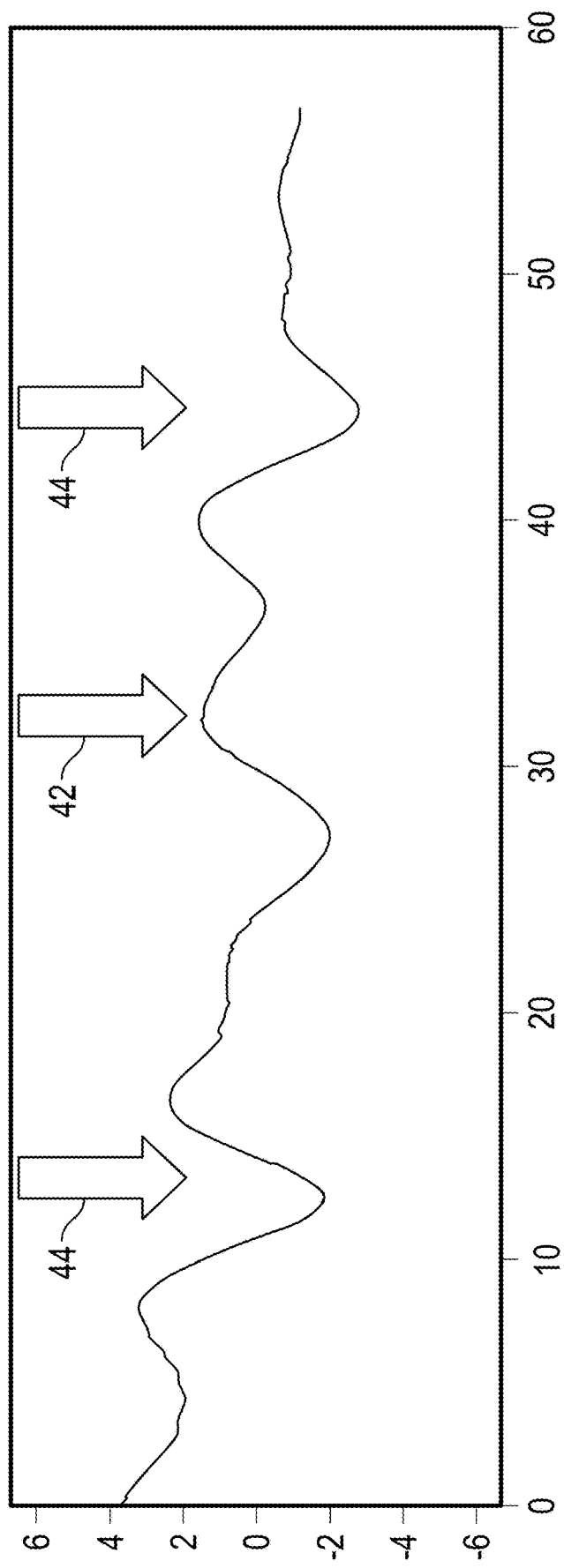

As can be seen in FIGS. 8A and 8B, the coating layer 14 that had no gas jet 20 had variations in the slope 46 of the coating layer surface 28 that were quite steep. Referring to FIGS. 9A and 9B, the slope 46 of the coating layer surface 28 is less steep than in FIGS. 8A and 8B. In FIGS. 10A and 10B, the pressure of the gas jet 20 was greater than in FIGS. 9A and 9B, and the steepness of the slope 46 of the coating layer surface 28 is further decreased. FIGS. 11A-12B have a more gradual slope 46 of the coating layer surface 28 than in FIGS. 8A-8B. FIGS. 13A and 13B show increasing variation in the coating layer thickness 24 and in the steepness of the slope 46 of the coating layer thickness 24 at the outer edges of the gas jet application area 44, suggesting the pressure of the gas jet 20 should be optimized to provide the smoothest surface.

The same coating composition 10 was used in all the tests illustrated in FIGS. 8A-13B. The coating composition 10 used in the tests included the components listed in Table 1 below, where the weight percent is based on a total weight of the coating composition 10.

TABLE 1

| Component | Weight % |
|---|---|
| High solids enamel resin, 60% enamel resin in 40% solvent. Enamel resin had a weight average molecular weight of 7,000 | 0.15 |
| Melamine formaldehyde resin, which is methylated, isobutylated, and with a high degree of alkylation (hexaether) | 16.95 |
| Alkyd resin, including: 48% isononanoic acid; 22% pentaerythritol; 30% phthalic anhydride | 32.07 |
| Xylene | 1.18 |
| Polyamide wax | 12.5 |
| Dodecyl benzene sulfonic acid solution | 1.2 |
| Dipropylene glycol methyl ether | 2.13 |
| Isobutyl alcohol | 2.47 |
| Aromatic hydrocarbon blend, boiling point of 140-200° C., density of 0.8750 g/l @ 20° C. | 5.07 |
| 63.3% solvent; 18 + % carbon black; 18 + % acrylic dispersant | 3.81 |
| Dibasic ester | 3.42 |
| 52% polyether modified methylalkyl polysiloxane; 42.9% mineral spirits; 5.1% propylene glycol monomethyl ether acetate | 0.05 |
| Aromatic solvents (Solvesso ™ 150) | 19 |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method of coating a substrate comprising the steps of:
    applying a coating composition to the substrate with an applicator to produce a coating layer, wherein the applicator comprises a print head assembly that applies the coating composition onto the substrate, wherein the applicator and the substrate remain spatially separate while applying the coating composition, wherein the print head assembly is positioned at a distance of from about 1 to about 30 millimeters from the substrate during application of the coating composition, wherein the coating composition has a viscosity of from about 1,000 to about 1,000,000 centipoise when the coating composition is subject to a shear rate of about 0.1 reciprocal second ($s^{-1}$), wherein the coating composition is non-Newtonian such that a coating composition viscosity decreases when the shear rate is increased to the coating composition; and
    impinging the coating layer with a gas having a laminar gas flow such that a coating layer surface moves upon impingement with the gas.

2. The method of claim 1, wherein:
    impinging the coating layer comprises forming a textured surface of the coating layer, wherein the textured surface is uneven such that a slope of a coating layer thickness is about +/−0.4 microns per millimeter or greater measured over the coating layer surface.

3. The method of claim 1, wherein the coating composition comprises a rheology modifier.

4. The method of claim 1, wherein the coating composition has the viscosity of from about 5,000 to about 500,000 centipoise when the coating composition is subject to the shear rate of about 0.1 $s^{-1}$.

5. The method of claim 1, wherein the viscosity of the coating composition is from about 1 to about 100 centipoise when exposed to the shear rate of about 1,000 $s^{-1}$.

6. The method of claim 1, wherein the viscosity of the coating composition is from about 7,500 to about 200,000 centipoise when the coating composition is subject to the shear rate of about 0.1 $s^{-1}$, and wherein the viscosity of the coating composition is from about 1 to about 100 centipoise when exposed to the shear rate of about 1,000 $s^{-1}$.

7. The method of claim 1, wherein applying the coating composition comprises jetting the coating composition from a plurality of the applicators in the print head assembly to form a coating line having two coating line edges and a coating line center; and
    wherein impinging the coating layer comprises impinging the two coating line edges with an edge force and impinging the coating line center with a center force that is less than the edge force.

8. The method of claim 1, wherein:
    impinging the coating layer comprises impinging the coating layer with air.

9. The method of claim 1, wherein:
    the coating composition comprises a coating composition solvent concentration of from about 15 to about 85 weight percent, based on a total weight of the coating composition.

10. The method of claim 1, wherein:
    applying the coating composition comprises forming an imperfection in the coating layer, wherein a slope of a coating layer thickness is about +/−0.4 microns per millimeter or greater measured over the coating layer surface at the imperfection for a distance of about 20 millimeters or greater.

11. The method of claim 10, wherein:
impinging the coating layer comprises moving the coating layer such that the slope of the coating layer thickness is about +/−0.4 microns per millimeter or less measured over the coating layer surface for the distance of about 20 millimeters or greater.

12. The method of claim 1, wherein a coating composition solvent concentration is about the same as a coating layer solvent concentration prior to impinging the coating layer.

13. The method of claim 1, wherein:
a gas jet head is utilized for the gas, and the gas jet head is connected to the print head assembly.

14. The method of claim 1, wherein:
impinging the coating layer occurs within about 0.5 seconds or less after applying the coating composition.

15. A method of coating a substrate comprising the steps of:
applying a coating composition to the substrate with an applicator to produce a coating layer, wherein the applicator and the substrate remain spatially separate while applying the coating composition such that a print head assembly of the applicator is positioned at a distance of from about 1 to about 30 millimeters from the substrate during application of the coating composition, wherein the substrate comprises a portion of an automobile, wherein the coating composition has a viscosity of from about 5,000 to about 500,000 centipoise when the coating composition is subject to a shear rate of about 0.1 reciprocal seconds ($s^{-1}$), wherein the coating composition is non-Newtonian such that a coating composition viscosity decreases when the shear rate is increased to the coating composition, wherein the coating is a paint, wherein the substrate is in a position other than horizontal during application of the coating composition; and
impinging the coating layer with a gas having a laminar gas flow such that a coating layer surface moves upon impingement with the gas.

16. A method of coating a substrate comprising the steps of:
applying a coating composition to the substrate with an applicator to produce a coating layer, wherein the applicator and the substrate remain spatially separate by a distance of from about 1 to about 30 millimeters while applying the coating composition, wherein the coating is a paint, wherein the coating composition is non-Newtonian such that a coating composition viscosity decreases when the shear rate is increased to the coating composition; and
impinging the coating layer with a gas having a laminar gas flow such that a textured surface is formed on the coating layer, wherein the textured surface has a coating layer thickness that varies.

17. The method of claim 16, wherein impinging the coating layer comprises applying a pulsed force to the coating layer.

18. The method of claim 16, wherein the coating composition has a viscosity of from about 1,000 to about 1,000,000 centipoise when the coating composition is subject to a shear rate of about 0.1 reciprocal seconds ($s^{-1}$).

19. The method of claim 16, wherein a coating composition solvent concentration is about the same as a coating layer solvent concentration prior to impinging the coating layer.

20. The method of claim 16, wherein the textured surface is dimpled.

* * * * *